United States Patent
Wang et al.

(10) Patent No.: US 12,333,762 B2
(45) Date of Patent: Jun. 17, 2025

(54) METHODS FOR CAMERA CALIBRATION VIA BUNDLE ADJUSTMENT

(71) Applicant: Apple Inc., Cupertino, CA (US)

(72) Inventors: Tianheng Wang, San Diego, CA (US); Stergios Roumeliotis, Los Altos Hills, CA (US); Shuntaro Yamazaki, Cupertino, CA (US); Oleg Naroditsky, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 119 days.

(21) Appl. No.: 18/466,426

(22) Filed: Sep. 13, 2023

(65) Prior Publication Data

US 2024/0104778 A1 Mar. 28, 2024

Related U.S. Application Data

(60) Provisional application No. 63/375,777, filed on Sep. 15, 2022.

(51) Int. Cl.
*H04N 13/246* (2018.01)
*G02B 27/01* (2006.01)
*G06T 7/80* (2017.01)

(52) U.S. Cl.
CPC ............ *G06T 7/85* (2017.01); *G02B 27/0172* (2013.01); *H04N 13/246* (2018.05); *G02B 2027/0134* (2013.01)

(58) Field of Classification Search
CPC .................. G06T 7/85; G02B 27/0172; G02B 2027/0134; G02B 2027/0138; H04N 13/246

(Continued)

(56) References Cited

U.S. PATENT DOCUMENTS

| 9,686,539 B1 | 6/2017 | Zuliani et al. |
| 9,706,188 B2 | 7/2017 | Yu et al. |

(Continued)

FOREIGN PATENT DOCUMENTS

CN 116295525 6/2023

OTHER PUBLICATIONS

Youwei, et al., "Fast Extrinsic Calibration for Multiple Inertial Measurement Units in Visual-Inertial Systems," 2023 IEEE International Conference on Robotics and Automation (ICRA 2023) pp. 11481-11487.

(Continued)

*Primary Examiner* — Tung T Vo
(74) *Attorney, Agent, or Firm* — Alexander A. Knapp; Kowert, Hood, Munyon, Rankin & Goetzel, P.C.

(57) ABSTRACT

Methods for performing a camera calibration process for outward-facing cameras on devices such as head-mounted display devices are disclosed. Using cameras with overlapping fields of view, relative rotational parameters of the cameras with respect to one another may be determined using an optimization technique such as a two-view bundle adjustment algorithm. A statistical analysis of the relative rotational parameters of the cameras, determined for a plurality of moments in time, may then be made to provide updated relative rotational parameters for recalibration of the cameras. A camera calibration process, such as those disclosed, may not depend on tracking points of interest over multiple moments in time, but rather on a convergence of the relative rotational parameters determined for respective moments in time.

20 Claims, 9 Drawing Sheets

(58) Field of Classification Search
USPC .......................................................... 348/42
See application file for complete search history.

(56) References Cited

U.S. PATENT DOCUMENTS

| | | | |
|---|---|---|---|
| 9,986,173 B2 | 5/2018 | Wang et al. | |
| 10,096,114 B1* | 10/2018 | Lasenby | G06T 7/73 |
| 10,218,885 B2 | 2/2019 | Hollinger | |
| 10,488,223 B1 | 11/2019 | Yee et al. | |
| 10,719,727 B2 | 7/2020 | Stanimirovic et al. | |
| 10,839,557 B1 | 11/2020 | Arora et al. | |
| 11,041,958 B2 | 6/2021 | Li et al. | |
| 11,244,649 B2 | 2/2022 | Chi et al. | |
| 11,680,824 B1 | 6/2023 | Navin et al. | |
| 11,709,236 B2 | 7/2023 | Smits | |
| 11,776,160 B2 | 10/2023 | Deng et al. | |
| 2015/0279017 A1* | 10/2015 | Tamura | G06T 7/85 382/103 |
| 2017/0094251 A1* | 3/2017 | Wolke | G06T 7/593 |
| 2018/0108150 A1 | 4/2018 | Curtis | |
| 2019/0208181 A1* | 7/2019 | Rowell | H04N 9/8205 |
| 2020/0007843 A1* | 1/2020 | Zhang | H04N 23/80 |
| 2020/0027243 A1* | 1/2020 | Ziegler | H04N 13/246 |
| 2020/0132451 A1* | 4/2020 | Wei | G01B 21/042 |
| 2022/0137636 A1 | 5/2022 | Yang et al. | |
| 2023/0005184 A1 | 1/2023 | Jiang et al. | |
| 2023/0066919 A1 | 3/2023 | Navin et al. | |
| 2023/0277249 A1 | 9/2023 | Bork et al. | |
| 2023/0283757 A1 | 9/2023 | Handa et al. | |
| 2023/0296902 A1 | 9/2023 | Birklbauer | |
| 2023/0306682 A1 | 9/2023 | Paris et al. | |
| 2023/0401687 A1* | 12/2023 | Winters | G06T 7/85 |
| 2024/0371035 A1* | 11/2024 | Jadhav | G01S 17/86 |

OTHER PUBLICATIONS

U.S. Appl. No. 18/466,379, filed Sep. 13, 2023, Shuntaro Yamazaki, et al.

U.S. Appl. No. 18/466,373, filed Sep. 13, 2023, Daniel C. Byrnes, et al.

U.S. Appl. No. 18/466,437, filed Sep. 13, 2023, Stergios Roumeliotis, et al.

* cited by examiner

METHODS FOR CAMERA CALIBRATION VIA BUNDLE ADJUSTMENT

PRIORITY DATA

This application claims benefit of priority to U.S. Provisional Application Ser. No. 63/375,777, entitled "Methods for Camera Calibration via Bundle Adjustment", filed Sep. 15, 2022, and which is incorporated herein by reference in its entirety.

BACKGROUND

Discussion of Background

Extended reality (XR) systems such as mixed reality (MR) or augmented reality (AR) systems combine computer generated information (referred to as virtual content) with real world images or a real-world view to augment, or add content to, a user's view of the world. XR systems may thus be utilized to provide an interactive user experience for multiple applications, such as applications that add virtual content to a real-time view of the viewer's environment, interacting with virtual training environments, gaming, remotely controlling drones or other mechanical systems, viewing digital media content, interacting with the Internet, or the like.

SUMMARY

Various embodiments of methods and systems for calibrating cameras on devices such as head-mounted display devices (HMDs) including but not limited to HMDs used in virtual reality (VR), augmented reality (AR), mixed reality (MR), and/or extended reality (XR) applications are described. HMDs may include wearable devices such as headsets, helmets, goggles, or glasses. A system may include an HMD which may include one or more cameras that may be used to capture still images or video frames of the user's environment. The HMD may include lenses or displays positioned in front of the eyes through which the wearer can view the environment. In such systems, virtual content may be displayed on or projected onto these lenses or displays to make the virtual content visible to the wearer. In some embodiments, the wearer may view the virtual content while still being able to view the real environment through the lenses.

Camera calibration processes described herein pertain to conducting a lightweight and efficient camera calibration process for recalibration of rotational parameters of cameras with overlapping fields of view (e.g., a stereo pair of cameras). Optimization techniques such as two-view bundle adjustment are repeated for a plurality of moments in time such that a statistical analysis of relative rotational parameters may be made, allowing said calibration processes to be efficient in terms of power consumption savings.

Figure 1A:
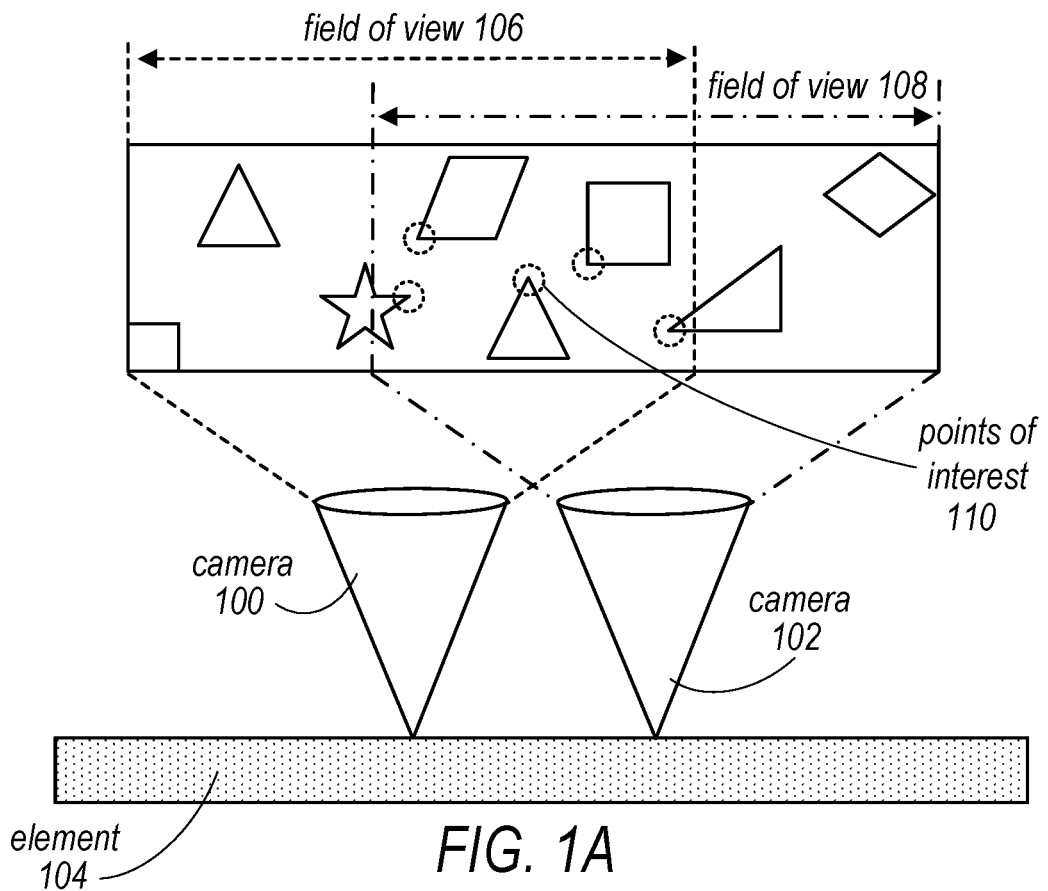
FIG. 1A illustrates determining points of interest within images captured by respective cameras with overlapping fields of view at a given moment in time, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and techniques for performing camera calibration processes for devices, such as head-mounted display devices (HMDs), are described. During usage of a given device (such as a HMD), parameters of cameras of the device may drift from original calibration values (e.g., due to thermal effects, due to aging of materials, due to a drop event, etc.) and may require recalibration of the cameras to be performed in a way that is both robust and efficient for the device (e.g., depending upon current power availability/consumption of the device, user comfort, the running of additional programs/algorithms that also may require processing power, etc.). This may also be referred to as an "in the field" calibration of the camera because the calibration takes places in an environment as opposed to in a factory at the time of manufacture of the device.

One or more calibration parameters of cameras of a given device may have need for recalibration throughout the usage of the device, such as intrinsic parameters of the cameras (e.g., focal lengths, principal points, etc.) and/or extrinsic parameters of the cameras (e.g., rotational parameters, translational parameters, etc.). Before resulting to performing a computationally intensive and/or power consuming camera calibration process (e.g., a large optimization problem pertaining to all intrinsic and extrinsic parameters of the cameras, an optimization problem that may require calibrated parameters of one or more other components of the device such as an inertial measurement unit, etc.) it may be advantageous to perform a lightweight camera calibration process pertaining to rotational parameters of the cameras in order to attempt to recalibrate the cameras more efficiently. Lightweight camera calibration processes such as those described herein may be considered as "lightweight" since they may not depend on tracking points of interest within images captured via the cameras across multiple timesteps, in addition to relying on optimization techniques such as two-view bundle adjustment, which may be used to estimate relative rotational parameters of cameras for respective moments in time. By performing a statistical analysis of the estimated rotational parameters of the cameras over a plurality of timesteps (which may be asynchronously collected), the calibration process remains computationally lightweight and efficient.

In some embodiments, cameras may be mounted on a device, such as a head-mounted display device, and/or another device that may require in the field recalibration for calibration parameters of the cameras. Head-mounted display devices may include wearable devices such as headsets, helmets, goggles, or glasses. In some embodiments, a system may include a head-mounted display device which may include cameras that may be used to capture still images or video frames of the user's environment. In addition, a head-mounted display device may be implemented that does not necessarily provide certain AR/VR/MR/XR capabilities but that does include one or more cameras that may be used to capture still images or video frames of the user's environment. The head-mounted display device may include lenses and/or displays positioned in front of the eyes through which the wearer can view the environment. In some systems, virtual content may be displayed on or projected onto these lenses to make the virtual content visible to the wearer while still being able to view the real environment through the lenses.

This written description continues with a general description of camera calibration processes. Examples of recalibrating cameras, via an optimization technique (e.g., bundle adjustment), are then discussed, followed by examples of performing a camera calibration verification process to verify values of one or more updated calibration parameters of the camera that may have changed during said recalibration process. Finally, a description of an example computing system upon which the various components, modules, systems, devices, and/or calibration algorithms may be implemented is provided. Various examples are provided throughout the specification. A person having ordinary skill in the art should also understand that the previous and following description of camera calibration processes is not to be construed as limiting as to the implementation of the calibration processes, or portions thereof.

FIG. 1A illustrates determining points of interest within images captured by respective cameras with overlapping fields of view at a given moment in time, according to some embodiments.

In some embodiments, determining points of interest within images captured by cameras of a given device with overlapping fields of view, such as cameras 100 and 102, may resemble embodiments shown in FIG. 1A. Cameras 100 and 102 may be outward-facing cameras that capture images of a scene and/or environment (see the description for devices 600, 700, and 800 herein). Cameras 100 and 102 may be defined as sensors that either directly or indirectly measure direction and/or distance in three-dimensional space using captured images (e.g., RGB color sensors, event-based cameras, night vision cameras, color cameras, etc.). Cameras 100 and 102 may have parameters, such as extrinsic (e.g., relative rotational and translational parameters) and intrinsic (e.g., respective principal points and focal lengths) parameters, that may be calibrated and/or recalibrated throughout usage of a given device comprising cameras 100 and 102, according to some embodiments. Some or all of such parameters may define a geometric relationship between the cameras with respect to one another, and/or geometric relationships between the cameras and other components of a given device, according to some embodiments.

In some embodiments, cameras 100 and 102 may be referred to as "stereo" cameras (e.g., cameras that are in a stereoscopic configuration with one another), as they have at least partially overlapping fields of views (e.g., fields of view 106 and 108, respectively). FIG. 1A depict two cameras, however more than two cameras that have overlapping fields of view for a given scene may concurrently be used within a given camera calibration process, according to some embodiments.

In some embodiments, such as those shown in FIG. 1A, it may be assumed that cameras 100 and 102 may be mounted and/or connected onto a rigid body of a given device (e.g., element 104). In some embodiments, cameras 100 and 102 may be mounted on a non-rigid body of a given device that is converted into a rigid arrangement when worn by a user. For example, an elastic band to which the components are attached may function as a rigid structure when tightly affixed to a user's body, such as the user's head. In such embodiments, element 104 may be viewed as a locally rigid support of a larger (non-rigid) device (see the description of devices 600 and 700 herein for further discussion). In some embodiments, such as Timestep 1 and Timestep 1+N shown in FIGS. 2A-2B, it may be assumed that cameras 100 and 102 are mounted onto a rigid body of a given device (e.g., element 104) and therefore motion within a scene, such as motion shown between FIGS. 2A-2B, may be assumed to be due to the movement of the device (e.g., a user with the device attached to their head turning their head, stepping forward/backward, etc.).

Points of interest that are selected to be used for camera calibration processes may be defined as sets of one or more points within images respectively captured via cameras 100 and 102. A person having ordinary skill in the art should understand that points of interest 110 are meant to be representative of given distinct and/or identifiable components of images captured by the camera (e.g., components at various distances between one another and the camera, of various sizes with respect to one another, etc.), and should not be misconstrued as being representative of the only types of points of interest that may be selected. Also, note that while the term "points of interest" is used for ease of explanation, in some embodiments, a "point of interest" may have various shapes and is not limited to items defined by a single point (e.g., points of interest may be interpreted as "features" of images captured by respective cameras, according to some embodiments).

In some embodiments, selection of points of interest may depend on certain quality characteristics of images captured by cameras 100 and 102. For example, ideal points of interest that may be used as one or more inputs to a camera calibration process for cameras 100 and 102 may represent a distribution of points across multiple regions of fields of view 106 and 108. The ideal points of interest may also represent points in a given scene captured by cameras with overlapping fields of view that are within a given focusing range of the cameras (e.g., the points are not out-of-focus and/or blurred due to being too close or too far away from the cameras). In some embodiments, points of interest may be selected based on how close the respective points of interest resemble such "ideal points of interest." Determined points of interest may also depend on lighting quality of a scene represented in the captured images (e.g., having images that are neither too dark nor too saturated) and/or a texture within the scene. For example, there may be a limited number of points of interest available to be selected if a user of a device is facing a blank wall, also known as a low-texture scene, versus if the user of the device is facing a wall with patterned wallpaper. Furthermore, camera calibration processes such as those described herein may use the same and/or different points of interest across multiple timesteps (e.g., said camera calibration processes may not depend on the need to track the same points of interest across multiple timesteps). For example, one or more of points of interest 110 may be different with respect to points of interest 126, wherein five points of interest are selected in FIG. 1A due, at least in part, to their placement within fields of view 106 and 108 at the moment in time depicted in FIG. 1A, while four points of interest are selected in FIG. 1C due, at least in part, to their placement within fields of view 122 and 124 at the different moment in time depicted in FIG. 1C. In another example, one or more of points of interest 224 may be different with respect to points of interest 210, as shown in FIGS. 2A-2B.

In some embodiments, some points of interest may be prioritized over other potential points of interest based on whether the points are visible and trackable within both cameras 100 and 102 at a given moment in time, meaning that the prioritized points of interest are located in the overlapping parts of the respective fields of view of the cameras. As shown in FIG. 1A, points of interest 110 are located both within field of view 106 and field of view 108 of cameras 100 and 102. Additional criteria for the prioritization of points of interest may pertain to the points of interest falling within certain distances of one another, the points having a certain distance to the cameras, the points having a high Laplacian value (e.g., having a sharp corner), and/or the points having an acceptable distribution across the overlapping fields of view (e.g., covering the majority of the fields of view).

In some embodiments, determined points of interest used for a camera calibration process may be viewed in all respective fields of view of the multiple cameras, such as points of interest 110. However, in embodiments in which three or more cameras have overlapping fields of view, some points of interest may still be prioritized even though they are within two out of three respective fields of view for two of the three cameras, for example. In such cases, a first camera may have part of an overlapping field of view with a second camera (but not with a third camera), and the second camera may also have another part of its field of view that overlaps with the third camera, creating linked chain of overlapping field of view. In examples such as this, the points of interest that may be used for the camera calibration process may be tracked in the two sets of overlapping fields of view of the multiple (e.g., three or more) cameras.

It may therefore be necessary to limit the number of points of interest that are tracked and used as input to the calibration process for the cameras in order to fit within a given power budget of the device, due to computational constraints of the device, or any other properties that defines "resource awareness" of the device. As such, a feature allocation scheme may be used to select certain points of interest from all available points of interest of the given fields of view of the multiple cameras. In some embodiments, a feature allocation scheme may prioritize certain points of interest over others and subsequently provide the prioritized points of interest as input to the calibration process for the cameras. In some embodiments, points of interest that may be prioritized over others may include points that are visible and trackable within both cameras 100 and 102, meaning that they are located in the overlapping parts of the respective fields of view of the stereo cameras. As shown in FIG. 1A, points of interest 110 are located both within field of view 106 and field of view 108.

Figure 1B:
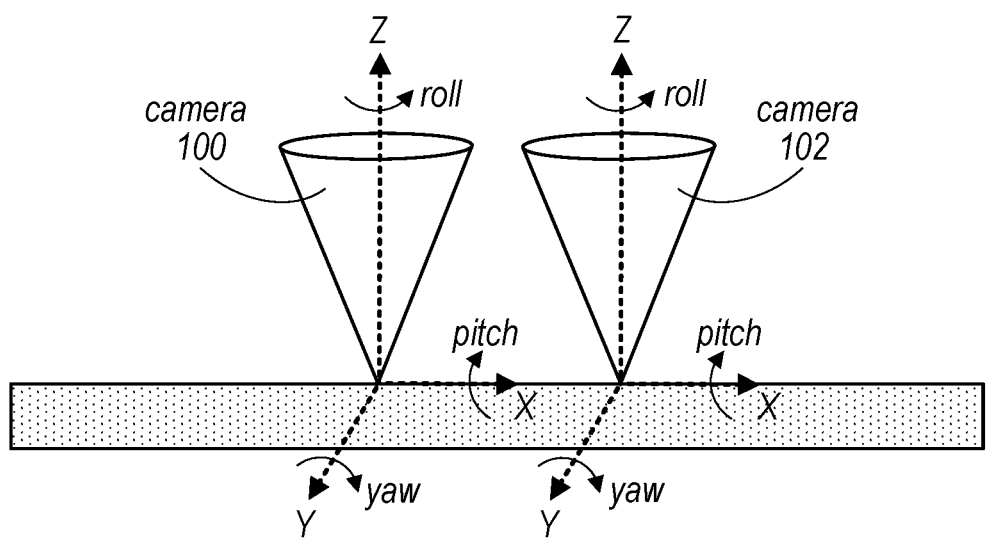
FIG. 1B illustrates rotational parameters of the cameras depicted in FIG. 1A relative to one another, according to some embodiments.

FIG. 1B illustrates rotational parameters of the cameras depicted in FIG. 1A relative to one another, according to some embodiments.

In some embodiments, rotational parameters as used herein may be defined as rotation about the XYZ axes as shown in FIG. 1B, which may also be referred to as pitch, yaw, and roll, respectively. Furthermore, "relative" rotational parameters, as used herein, may be defined as a rotation of one camera about one or more of the XYZ axes with respect to the other camera (e.g., camera 100 with respect to camera 102, or camera 102 with respect to camera 100, etc.).

Figure 1C:
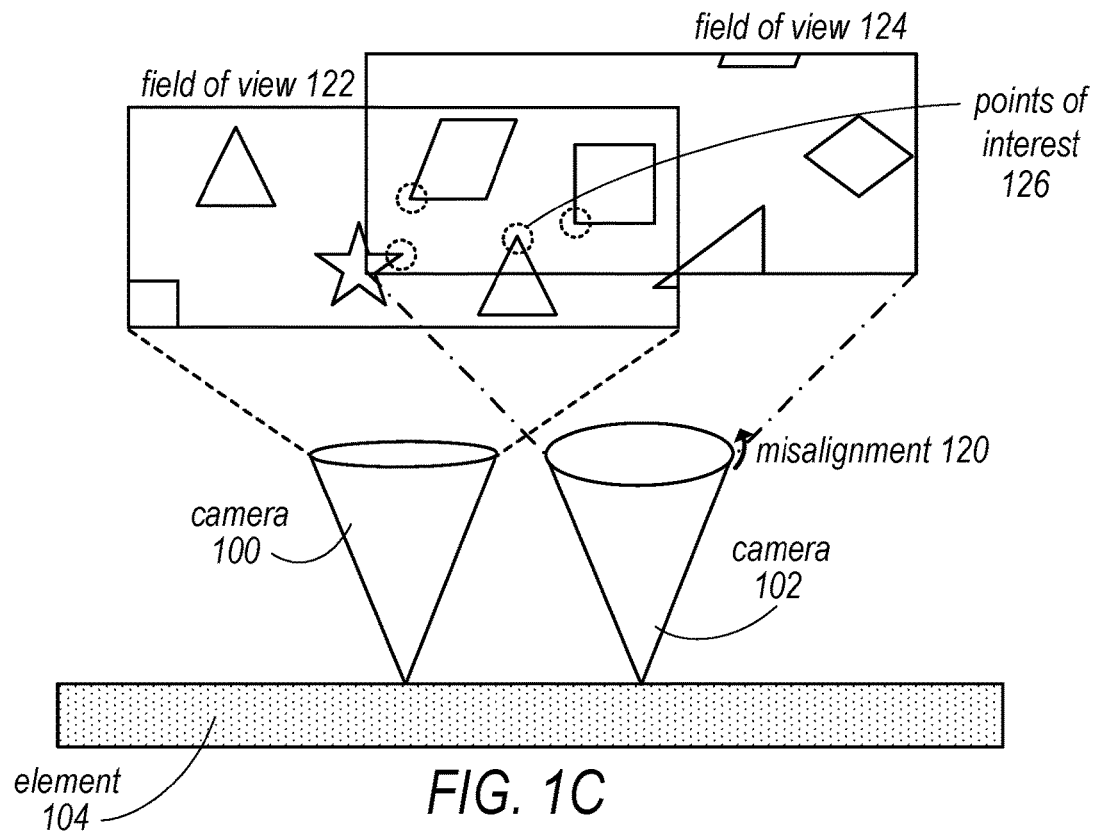
FIG. 1C illustrates determining points of interest within images captured by the respective cameras depicted in FIG. 1A at another moment in time following a misalignment event, according to some embodiments.
Figure 2A:
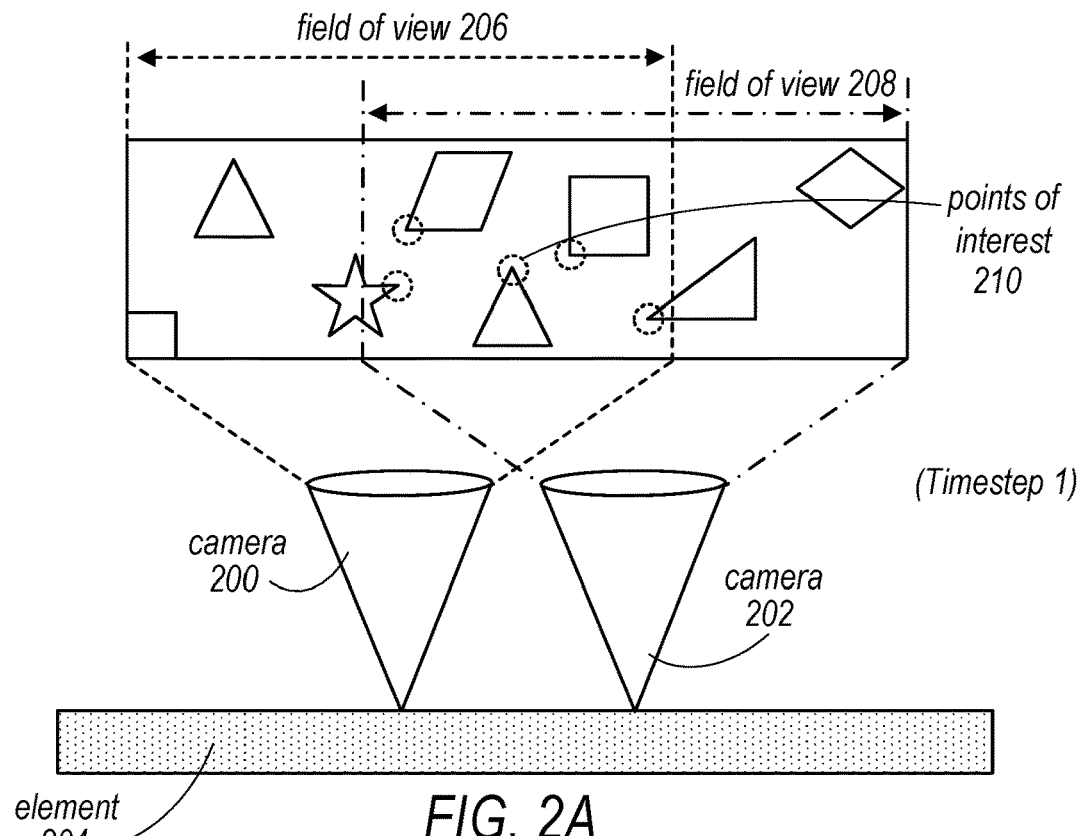
FIGS. 2A-2B illustrate determining points of interest within images captured by respective cameras at asynchronous moments in time, according to some embodiments.
Figure 2B:
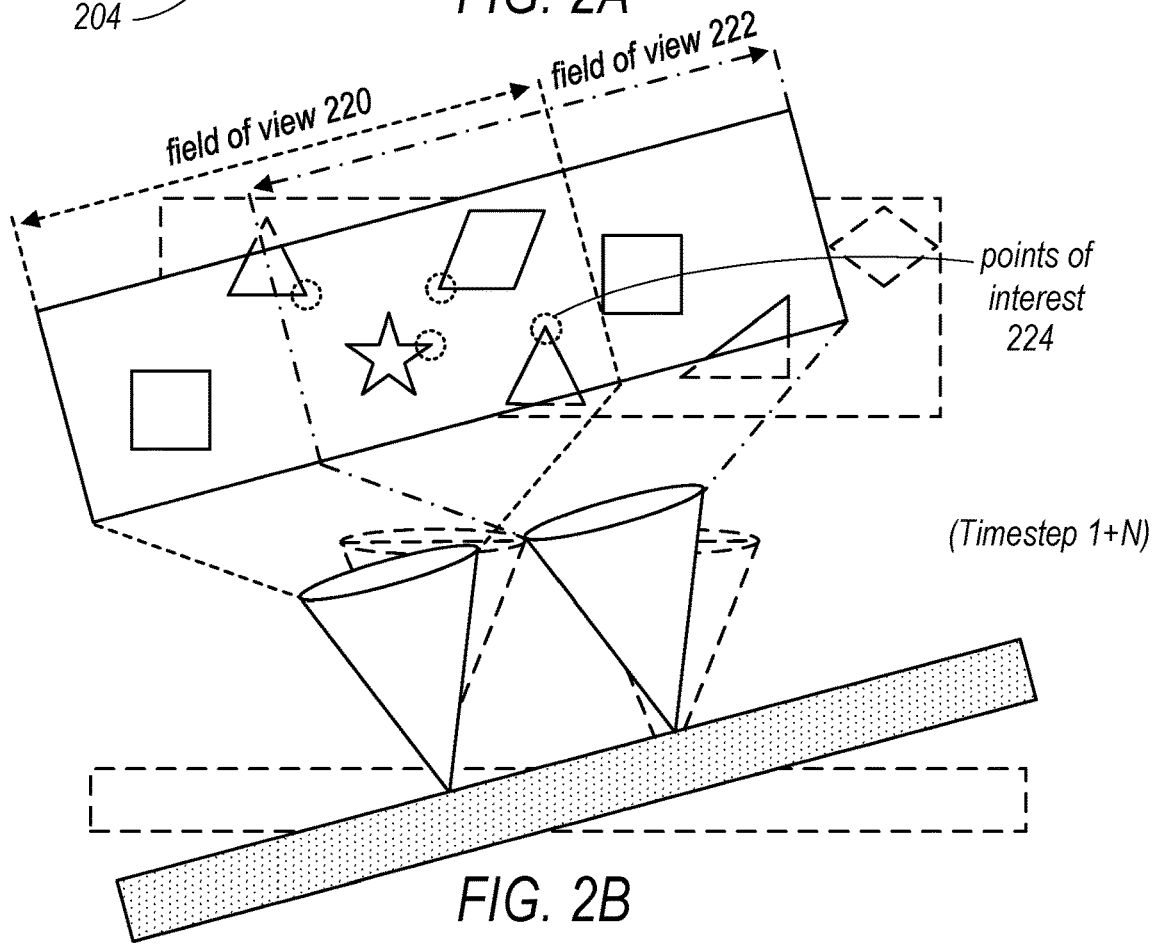

FIG. 1C illustrates determining points of interest within images captured by the respective cameras depicted in FIG. 1A at another moment in time following a misalignment event, according to some embodiments.

Throughout usage of a given device comprising cameras 100 and 102, one or more misalignment events may occur that cause a misalignment of one or more of the cameras with respect to their factory alignment settings. In some embodiments, fields of view 106 and 108 may resemble respective fields of view of cameras 100 and 102 at a moment in time prior to misalignment event 120, and fields of view 122 and 124 may resemble respective fields of view of cameras 100 and 102 at a moment in time after misalignment event 120. As shown in FIG. 1C, field of view 122 may resemble field of view 106, while field of view 124 may have shifted with respect to field of view 108, according to some embodiments.

In some embodiments, a miscalibration-inducing event (e.g., an event that causes shock and/or plastic deformation to one or more components of a given device comprising element 104 and respective components mounted onto element 104) may result in misalignment 120 of camera 102. As shown by shifted field of view 124, misalignment 120 may be described as a misalignment along one of the rotational axes of camera 102 (e.g., rotation about the X axis according to definitions shown in FIG. 1B), and may be referred to as a misalignment of a rotational parameter of camera 102. A person having ordinary skill in the art should understand that misalignment 120 is meant to be representative of a type of misalignment scenario of camera 102 that could occur during usage of a device comprising cameras 100 and 102, and that other variations of misalignments involving one or both of cameras 100 and 102 are meant to be encompassed in the discussion herein. Furthermore, some embodiments of misalignment 120 may additionally impact more than one rotational parameter of one or both of cameras 100 and 102, one or more translational parameters of one or both of cameras 100 and 102, respective principal points, respective focal lengths, etc. In addition, a miscalibration-inducing event may also cause a misalignment of other components of a given device, such as an inertial measurement unit located on the device (e.g., inertial measurement unit(s) 960), a cover glass and/or display for the cameras (e.g., display 606, displays 706 and/or 708, display(s) 980, etc.), another sensor located on the device (e.g., sensor(s) 970), etc., which may impact success (or not) of recalibrating cameras 100 and 202, according to some embodiments.

Figure 1D:
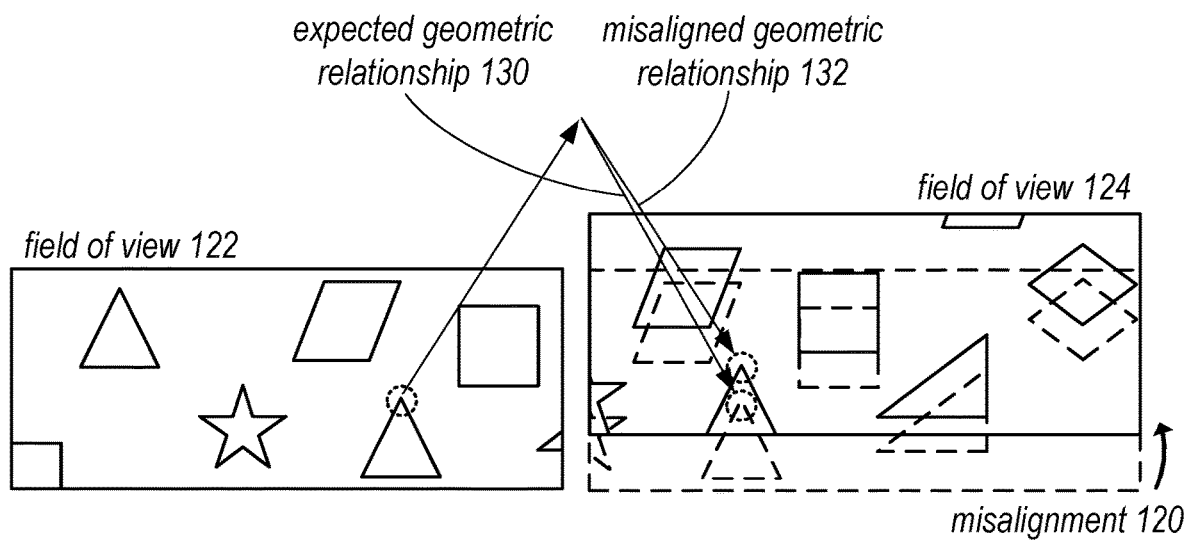
FIG. 1D illustrates estimating relative rotational parameters of the cameras, at the moment in time depicted in FIG. 1C, via an optimization technique, according to some embodiments.

FIG. 1D illustrates estimating relative rotational parameters of the cameras, at the moment in time depicted in FIG. 1C, via an optimization technique, according to some embodiments.

Figures 3A, 3B:
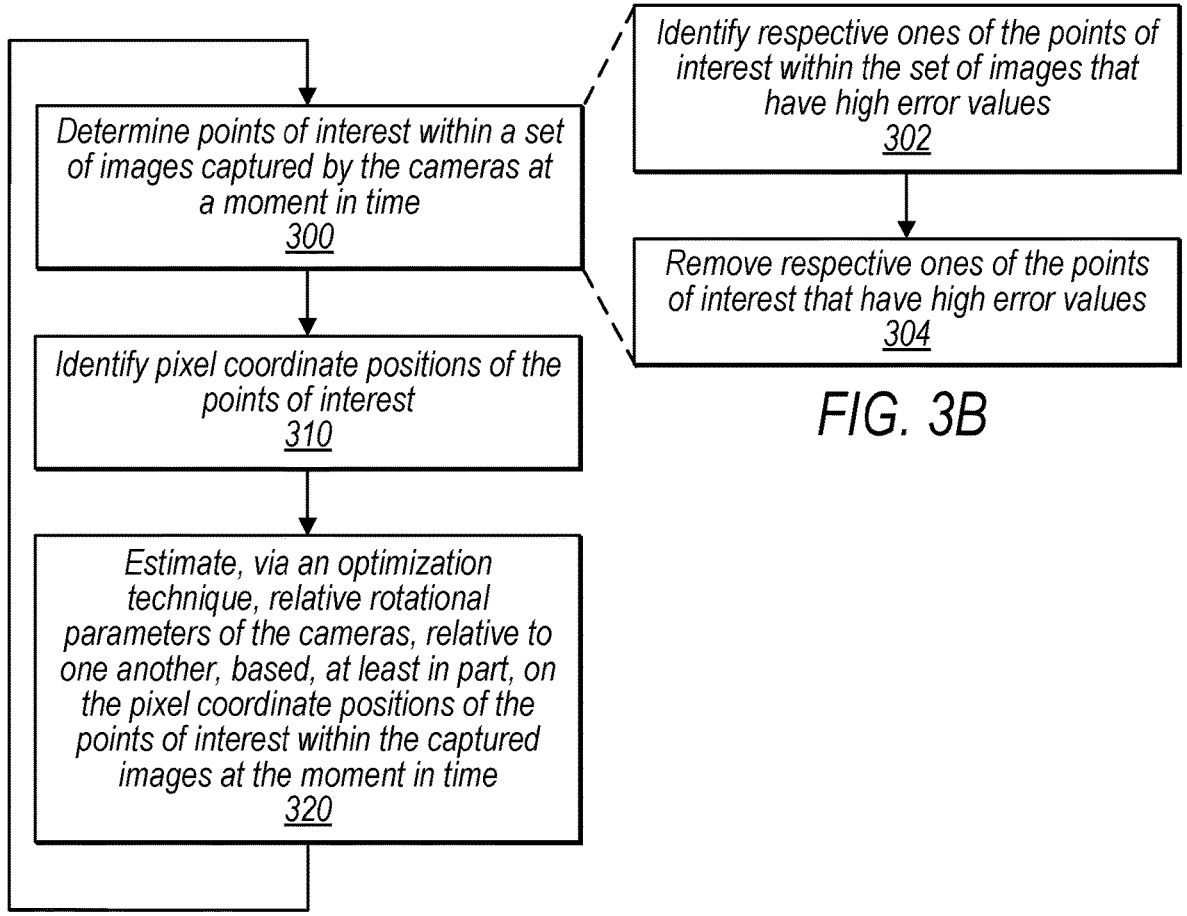
FIG. 3A is a flow diagram illustrating a process of estimating relative rotational parameters of the cameras via an optimization technique as part of a camera calibration process, according to some embodiments.
FIG. 3B is a flow diagram illustrating a process of performing outlier rejection during a calibration process such as illustrated in FIG. 3A, according to some embodiments.

In some embodiments, a camera calibration process may be performed following a miscalibration-inducing event in order to attempt to correct for one or more misalignments that may have occurred due to the event and provide updated parameter(s) for the impacted camera(s). Camera calibration processes, such as those described herein, may resemble some embodiments as shown in FIG. 3A, and may be visually represented via expected geometric relationship 130 and misaligned geometric relationship 132. As shown in FIG. 1D, expected geometric relationship 130 may represent a projection of point of interest 126, as viewed via field of view 122 of camera 100, onto field of view 124 of camera 102, according to some embodiments. Such a projection may be estimated using one or more calibration parameters of cameras 100 and 102 (e.g., relative rotational and/or translational parameters), and may represent where point of interest 126 is expected to be located within field of view 124 given said calibration parameters of cameras 100 and 102 (e.g., their geometric relationship). Misaligned geometric relationship 132 may represent a similar projection between cameras 100 and 102, but using an actual pixel coordinate location of point of interest 126. In some embodiments, a difference between expected geometric relationship 130 and misaligned geometric relationship 132 may represent an amount of misalignment determined during a given camera calibration process, and may be used to determine an updated geometric relationship between cameras 100 and 102 (e.g., one or more output relative rotational parameters) given information obtained via said difference.

Camera calibration processes, such as those described herein, may be performed using processors (e.g., processors 910 of computer system 900) that may execute program instructions related to steps of said camera calibration processes, according to some embodiments. In some embodiments, methods and techniques for performing a camera calibration process, such as those described herein, may resemble an algorithm such as that which is described in the following paragraphs, in which an optimization technique (e.g., bundle adjustment) may be used to estimate relative rotational parameters of cameras with respect to one another, such as cameras 100 and 102 which are connected to element 104. In some embodiments, bundle adjustment may be defined as an optimization algorithm that may solve for an optimal estimate of relative rotational parameters that best match pairs of points of interest in respective images captured via cameras (e.g., expected geometric relationship 130 and misaligned geometric relationship 132). By using pixel coordinate positions of common points of interest (e.g., points of interest that may be viewed in both fields of view 122 and 124) which may be related to relative orientations (e.g., rotational parameters) of cameras 100 and 102 with respect to one another, a geometric relationship between the cameras (e.g., via their relative rotational and/or translational parameters with respect to one another) may be used to calibrate relative rotational parameters of said cameras. In some embodiments, a bundle adjustment optimization technique may rely on images captured by cameras at a single moment in time, and may be referred to as "two-view" bundle adjustment. A two-view bundle adjustment may then be repeated for a number of times (see the descriptions for FIGS. 3A and 5 herein) while only relying on a given moment in time for respective estimations of relative rotational parameters. For example, a bundle adjustment optimization technique may be used to calculate relative rotational parameters of cameras 200 and 202 using determined points of interest 210 at Timestep 1, as depicted in FIG. 2A, and the bundle adjustment optimization technique may then be repeated to calculate updated relative rotational parameters of cameras 200 and 202 using determined points of interest 224 at Timestep 1+N, as depicted in FIG. 2B (but not determined points of interest 210).

In some embodiments, suppose N points of interest (e.g., points of interest 126) are determined by cameras 100 and 102 at the moment in time depicted in FIG. 1C. Let $^2_1C$ denote a 3×3 rotation matrix projecting vectors from field of view 122 of camera 100 (coordinate system) to field of view 124 of camera 102. Let $^k x_i$ be an inverse-depth representation of a 3D position of the ith point of interest (e.g., point of interest 126) in field of view 122 of camera 100, and let $^k p_i$ be a conventional 3D position. In some embodiments, a relationship between the inverse-depth representation and the conventional position may be written as $$^k x_i = \begin{bmatrix} ^1\alpha \\ ^1\beta \\ ^1\rho \end{bmatrix} \text{ and } ^k p_i = \begin{bmatrix} ^1\alpha \\ ^1\beta \\ 1 \end{bmatrix} \frac{1}{^1\rho}.$$

In some embodiments, $^1 z_i$ may represent a 2D measurement (e.g., calculated via processors 910) of an ith point of interest (e.g., point of interest 126) determined via an image captured using field of view 122 of camera 100, which may be expressed as a function of pixel coordinate positions of said ith point of interest, $$^1 z_i = \begin{bmatrix} ^1 u_i \\ ^1 v_i \end{bmatrix} = {}^1h(^1 x_i) + {}^1 n_i = \begin{bmatrix} ^1 p'_i(1)/^1 p'_i(3) \\ ^1 p'_i(2)/^1 p'_i(3) \end{bmatrix} + {}^1 n_i,$$

wherein $^1 n_i$ may be an 2×1 observation noise following Gaussian distribution $^1 n_i \sim N(0, {}^1 R_i)$, and $^1h$ may be a function that maps the 3D feature position of said ith point of interest to 2D image coordinates, where $$^1 p'_i = \begin{bmatrix} ^1 p'_i(1) \\ ^1 p'_i(2) \\ ^1 p'_i(3) \end{bmatrix} = K_1$$

$$^1 p_i = \begin{bmatrix} ^1 f_x & 0 & ^1 c_x \\ 0 & ^1 f_y & ^1 c_y \\ 0 & 0 & 1 \end{bmatrix} \begin{bmatrix} ^1\alpha_i \\ ^1\beta_i \\ 1 \end{bmatrix} \frac{1}{^1\rho_i} = \begin{bmatrix} ^1 f_x {}^1\alpha_i + {}^1 c_x \\ ^1 f_y {}^1\beta_i + {}^1 c_y \\ 1 \end{bmatrix} \frac{1}{^1\rho_i}.$$

In the above relation, $K_1$ may represent a calibration matrix of camera 100, $^1 f_x$ and $^1 f_y$ may be focal lengths of camera 100, and $[^1 c_x, {}^1 c_y]^T$ may be a principal point of camera 100, and by combining the above equations:

$$^1 z_i = \begin{bmatrix} ^1 f_x {}^1\alpha_i + {}^1 c_x \\ ^1 f_y {}^1\beta_i + {}^1 c_y \end{bmatrix} + {}^1 n_i.$$

Furthermore, in some embodiments, $^2 z_i$ may represent a 2D measurement (e.g., calculated via processors 910) of the ith point of interest (e.g., point of interest 126) determined via an image captured using field of view 124 of camera 102, which may be expressed as a function of pixel coordinate positions of said ith point of interest, $$^2 z_i = \begin{bmatrix} ^2 u_i \\ ^2 v_i \end{bmatrix} = {}^2h({}^2_1C, {}^1 x_i) + {}^2 n_i = \begin{bmatrix} ^2 p'_i(1)/^2 p'_i(3) \\ ^2 p'_i(2)/^2 p'_i(3) \end{bmatrix} + {}^2 n_i,$$

where $^2 n_i$ may be an 2×1 observation noise following Gaussian distribution $^2 n_i \sim N(0, {}^2 R_i)$, and $^2h$ may be a function that maps the 3D feature position of said ith point of interest to 2D image coordinates, where $$^2 p'_i = \begin{bmatrix} ^2 p'_i(1) \\ ^2 p'_i(2) \\ ^2 p'_i(3) \end{bmatrix} = K_2 \, {}^2 p_i.$$

Note that with the above geometry, $$^2 p_i = {}^2_1C \, {}^1 p_i + {}^2 t_1 = {}^2_1C \begin{bmatrix} ^1\alpha_i \\ ^1\beta_i \\ 1 \end{bmatrix} \frac{1}{^1\rho_i} + {}^2 t_1,$$

and that $^2h$ in the above equation for $^2 z_i$ may stay the same for $$^2 \bar{p}_i = {}^2_1C \begin{bmatrix} ^1\alpha_i \\ ^1\beta_i \\ 1 \end{bmatrix} = {}^2 t_1 \, {}^1\rho_i,$$

which may avoid division by the inverse depth $^1 p$ and therefore provide numerical stability, according to some embodiments.

In some embodiments, a maximum a posteriori (MAP) estimation of $^2_1C$ may be formulated as $$\left\{ {}^2_1C^*, \left\{ {}^1 x^*_i \right\}_{i=1}^N \right\} = \arg\max_{\{{}^2_1C, \{{}^1 x_i\}_{i=1}^N\}} \prod_{i=1}^N p({}^1 z_i | {}^1 x_i) p({}^2 z_i | {}^2_1C, {}^1 x_i)$$

$$= \arg\min_{\{{}^2_1C, \{{}^1 x_i\}_{i=1}^N\}} f({}^2_1C, \{{}^1 x_i\}_{i=1}^N),$$

with $$f\left(\left\{ {}^2_1C, \{{}^1 x_i\} \right\}_{i=1}^N\right) = \sum_{i=1}^N \left( \left\| {}^1 z_i - {}^1h({}^1 x_i) \right\|^2_{{}^1 R_i} + \left\| {}^2 z_i - {}^2h({}^2_1C, {}^1 x_i) \right\|^2_{{}^2 R_i} \right),$$

which may be referred to as a nonlinear least-squares problem. Note that $^2_1C$ and $\{^1 x_i\}_{i=1}^N$ may be jointly solved, according to some embodiments. In some embodiments, such a nonlinear least-squares problem may be solved iteratively (e.g., via Gauss-Newton's method, Levenberg-Marquardt's method, etc.), which may require linearizing said nonlinear functions with respect to the unknown states (e.g., $^2_1C$ and $\{^1 x_i\}$) and converting the original problem into a linear least-squares problem.

In order to linearize the first view $^1h$ (e.g., point of interest 126 as viewed via field of view 122 of camera 100), $^1 z_i$ may be used to write $$^1 \tilde{z}_i = {}^1 J_{{}^1 x_i} \, {}^1 \tilde{x}_i + {}^1 n_i,$$

where $^1\tilde{z} \triangleq {}^1z - h({}^1\hat{x}_i)$ with $^1\hat{x}_i$ being a current estimate of $^1x_i$, $^1x_i$, $^1\tilde{x}_i \triangleq {}^1x_i - {}^1\hat{x}_i$, and $$^1J_{1_{x_i}} = \frac{\partial^1 h}{\partial^1 x_f}\bigg|_{{}^1x_f = {}^1\hat{x}_f} = \begin{bmatrix} {}^1f_x & 0 & 0 \\ 0 & {}^1f_y & 0 \end{bmatrix}.$$

In order to linearize the second view $^2h$ (e.g., point of interest 126 as viewed via field of view 124 of camera 102), it may be noted that $_1^2C$ may be written as $$_1^2C = \exp(\lfloor_1^2\theta x\rfloor)_1^2\hat{C} \approx (I - \lfloor_1^2\theta x\rfloor)_1^2\hat{C},$$

where $_1^2\hat{C}$ may represent a current (e.g., at the moment in time depicted by FIG. 1C) estimate of $_1^2C$ and $_1^2\tilde{\theta}$ may represent a 3×1 rotation error matrix. It may then follow that $$^2\tilde{p}_i = {}_1^2\hat{C}\begin{bmatrix} ^1\alpha \\ ^1\beta \\ 1 \end{bmatrix} + {}^2t_1{}^1\rho \approx (I - \lfloor_1^2\tilde{\theta}\times\rfloor)_1^2\hat{C}\begin{bmatrix} ^1\alpha \\ ^1\beta \\ 1 \end{bmatrix} + {}^2t_1{}^1\rho.$$

In some embodiments, it may then follow from the above equations that $$^2\tilde{z}_i = {}^2J_{_1^2\tilde{\theta},i}{}_1^2\tilde{\theta} + {}^2J_{1_{x_i}}{}^1\tilde{x}_i + {}^2n_i,$$

where $$^2\tilde{z} \triangleq {}^2z - {}^2h({}_1^2\hat{C}, {}^1\hat{x}_i),$$

$$^2J_{1_{x_i}} = \frac{\partial^2 h}{\partial^2 p_i}\frac{\partial^2 p_i}{\partial^1 x_i}, \text{ and}$$

$$^2J_{_1^2\tilde{\theta},i} = \frac{\partial^2 h}{\partial^2 p_i}\frac{\partial^2 p_i}{\partial_1^2\tilde{\theta}},$$

in which $$\frac{\partial^2 h}{\partial^2 p_i} = \frac{1}{^2\tilde{p}_i(3)}\begin{bmatrix} ^2f_x & 0 & -(^2\hat{u} - {}^2c_x) \\ 0 & ^2f_y & -(^2\hat{v} - {}^2c_y) \end{bmatrix},$$

$$\frac{\partial^2 p_i}{\partial^1 x_i} = [{}_1^2c_1 \quad {}_1^2c_2 \quad {}^2t_1], \text{ and}$$

$$\frac{\partial^2 p_i}{\partial_1^2\tilde{\theta}} = \left[{}_1^2\hat{C}\begin{bmatrix} ^1\alpha \\ ^1\beta \\ 1 \end{bmatrix}\times\right],$$

where $_1^2c_1$ and $_1^2c_2$ may represent the first two columns of $_1^2\hat{C}$.

With linearization, $f(\{_1^2C, \{^1x_i\}_{i=1}^N\})$ may then be approximated as $$f\left(\{_1^2C, \{^1x_i\}_{i=1}^N\}\right) \approx f'\left(\{_1^2C, \{^1x_i\}_{i=1}^N\}\right) = \sum_{i=1}^N \left(\|^1\tilde{z}_i - {}^1J_{1_{x_i}}{}^1\tilde{x}_i\|_{1_{R_i}}^2 + \right.$$

$$\left.\|^2\tilde{z}_i - {}^2J_{_1^2\tilde{\theta}_i}{}_1^2\tilde{\theta} - {}^2J_{1_{x_i}}{}^1\tilde{x}_i\|_{2_{R_i}}^2\right) = \sum_{i=1}^N \left(\|^1\tilde{z}'_i - {}^1J'_{1_{x_i}}{}^1\tilde{x}_i\|^2 + \right.$$

$$\left.\|^2\tilde{z}'_i - {}^2J'_{_1^2\tilde{\theta}_i 2}{}_1^2\tilde{\theta} - {}^2J'_{1_{x_i}}{}^1\tilde{x}_i\|^2\right) = \sum_{i=1}^N \|\tilde{z}'_i - J'_{_1^2\tilde{\theta}_i,i}{}_1^2\tilde{\theta} - J'_{1_{x_i}}{}^1\tilde{x}_i\|^2,$$

where $$^1\tilde{z}'_i \triangleq {}^1R_i^{-\frac{1}{2}}{}^1\tilde{z}_i,$$

-continued $$^1J'_{1_{x_i}} \triangleq {}^1R_i^{-\frac{1}{2}}{}^1J_{1_{x_i}},$$

$$^2\tilde{z}'_i \triangleq {}^2R_i^{-\frac{1}{2}}{}^2\tilde{z}_i,$$

$$J'_{_1^2\tilde{\theta},i} \triangleq {}^2R_i^{-\frac{1}{2}}J_{_1^2\tilde{\theta},i}, \text{ and}$$

$$J'_{1_{x_i}} \triangleq {}^2R_i^{-\frac{1}{2}}{}^2J_{1_{x_i}}.$$

In addition, $$\tilde{z}'_i \triangleq \begin{bmatrix} ^1\tilde{z}'_i \\ ^2\tilde{z}'_i \end{bmatrix},$$

$$J'_{_1^2\tilde{\theta},i} \triangleq \begin{bmatrix} 0_{2\times 3} \\ ^2J'_{_1^2\tilde{\theta},i} \end{bmatrix}, \text{ and}$$

$$J'_{1_{x_i}} \triangleq \begin{bmatrix} ^1J'_{1_{x_i}} \\ ^2J'_{1_{x_i}} \end{bmatrix}.$$

In some embodiments, a 4×3 matrix $$J'_{1_{x_i}} \text{ in } \sum_{i=1}^N \|\tilde{z}'_i - J'_{_1^2\tilde{\theta},i}{}_1^2\tilde{\theta} - J'_{1_{x_i}}{}^1\tilde{x}_i\|^2$$

may have a null space with dimension 1. By letting $Q_i = [Q_{i,1} \ Q_{i,2}]$ be a 4×4 orthonormal matrix with $Q_{i,2}$ being the last column, $Q_{i,2}^T J'_{1_{x_i}} = 0_{1\times 3}$. Such $Q_i$ may be obtained through QR decomposition (e.g., decomposition of a given matrix into "Q" and "R" matrices) of $J'_{1_{x_i}}$, according to some embodiments:

$$f'\left(\{_1^2C, \{^1x_i\}_{i=1}^N\}\right) =$$

$$\sum_{i=1}^N \|\tilde{z}'_i - J'_{_1^2\tilde{\theta},i}{}_1^2\tilde{\theta} - J'_{1_{x_i}}{}^1\tilde{x}_i\|^2 = \sum_{i=1}^N \left\|\begin{bmatrix} Q_{i,1}^T \\ Q_{i,2}^T \end{bmatrix}\left(\tilde{z}'_i - J'_{_1^2\tilde{\theta},i}{}_1^2\tilde{\theta} - J'_{1_{x_i}}{}^1\tilde{x}_i\right)\right\|^2 =$$

$$\sum_{i=1}^N \left\|\begin{bmatrix} Q_{i,1}^T\tilde{z}'_i - Q_{i,1}^T J'_{_1^2\tilde{\theta},i}{}_1^2\tilde{\theta} - Q_{i,1}^T J'_{1_{x_i}}{}^1\tilde{x}_i \\ Q_{i,2}^T\tilde{z}'_i - Q_{i,2}^T J'_{_1^2\tilde{\theta},i}{}_1^2\tilde{\theta} \end{bmatrix}\right\|^2 =$$

$$\sum_{i=1}^N \left(\|Q_{i,1}^T\tilde{z}'_i - Q_{i,1}^T J'_{_1^2\tilde{\theta},i}{}_1^2\tilde{\theta} - Q_{i,1}^T J'_{1_{x_i}}{}^1\tilde{x}_i\|^2 + \|Q_{i,2}^T\tilde{z}'_i - Q_{i,2}^T J'_{_1^2\tilde{\theta},i}{}_1^2\tilde{\theta}\|^2\right).$$

In some embodiments, as the first term in the above solution to $f'(\{_1^2C, \{^1x_i\}_{i=1}^N\})$ may have three rows, an optimal solution $^1\tilde{x}_i^*$ may zero-out this term. Therefore, an optimal $_1^2\tilde{\theta}^*$ may be given by $$_1^2\tilde{\theta}^* = \arg\min_{_1^2\tilde{\theta}} \sum_{i=1}^N \left(\|Q_{i,2}^T\tilde{z}'_i - Q_{i,2}^T J'_{_1^2\tilde{\theta},i}{}_1^2\tilde{\theta}\|^2\right) \Leftrightarrow \left(\sum_{i=1}^N J'^T_{_1^2\tilde{\theta},i}Q_{i,2}Q_{i,2}^T J'_{_1^2\tilde{\theta},i}\right)_1^2\tilde{\theta}^* =$$

$$\sum_{i=1}^N J'^T_{_1^2\tilde{\theta},i}Q_{i,2}Q_{i,2}^T\tilde{z}'_i,$$

and then for every i, an optimal $^1\tilde{x}_i^*$ may be given by $$^1\tilde{x}_i^* = \arg\min_{1\tilde{x}_i} \left\| Q_{i,1}^T \tilde{z}_i' - Q_{i,1}^T J'_{\tilde{1}\tilde{\theta},i} {}^2\tilde{\theta}^* - Q_{i,1}^T J'_{1_{x_i}} {}^1\tilde{x}_i \right\|^2 \Leftrightarrow \left( J'^T_{1_{x_i}} Q_{i,1} Q_{i,1}^T J'_{1_{x_i}} \right) {}^1\tilde{x}_i^* =$$

$$J'^T_{1_{x_i}} Q_{i,1} \left( Q_{i,1}^T \tilde{z}_i' - Q_{i,1}^T J'_{\tilde{1}\tilde{\theta},i} {}^2\tilde{\theta}^* \right),$$

or $$^1\tilde{x}_i^* = \arg\min_{1\tilde{x}_i} \left\| \tilde{z}_i' - J'_{\tilde{1}\tilde{\theta},i} {}^2\tilde{\theta}^* - J'_{1_{x_i}} {}^1\tilde{x}_i \right\|^2 \Leftrightarrow \left( J'^T_{1_{x_i}} J'_{1_{x_i}} \right) 1\tilde{x}_i^* = J'^T_{1_{x_i}} \left( \tilde{z}_i' - J'_{\tilde{1}\tilde{\theta},i} {}^2\tilde{\theta}^* \right).$$

In some embodiments, computational complexity may be further reduced by using an analytical solution to $Q_{i,2}$, (e.g., null space of $J'_{1_{x_i}}$ instead of a QR decomposition), such that the left null space N of an n×3 matrix J, wherein J may be written in the form of $$J = \begin{bmatrix} J_1 & 0_{2\times 1} \\ J_2 & J_3 \end{bmatrix},$$

and $J_1$ may represent a 2×2 matrix, $J_2$ may represent (n−2)×2, and $J_3$ may represent (n−2)×1, may be given by a Gram-Schmidt orthogonalization of the row vectors of $$N' = [-VJ_2 J_1^{-1} \quad V]$$

$$V = \begin{bmatrix} -J_3(2) & J_3(1) & 0 & \cdots & 0 \\ -J_3(3) & 0 & J_3(1) & \cdots & 0 \\ \vdots & \vdots & \vdots & \ddots & \vdots \\ -J_3(n-2) & 0 & 0 & \cdots & J_3(1) \end{bmatrix}.$$

In some embodiments, matrix V in the above equation may have a full row rank of n−3 assuming $J_3(1) \neq 0$. Furthermore, for better numerical stability, an element in $J_3$ with the largest absolute value may be used instead of $J_3(1)$ for the "diagonal" part, and V may then be constructed similarly as was done in the above equation.

In some embodiments, a two-view bundle adjustment optimization technique, such as that which is described in the above paragraphs, may be repeated for multiple moments in time, wherein in each iteration, linearization of first and second views may be performed as described above, respective optimal solutions to respective error states $_1{}^2\tilde{\theta}$ and $\{^1\tilde{x}_i\}$ may be calculated as described above, and respective estimates $_1{}^2\hat{C}$ and $\{^1\hat{x}_i\}$ may be updated using $_1{}^2\tilde{C}^*$ and $\{^1\tilde{x}_i\}^*$ as $$_1{}^2\hat{C} = \exp(\lfloor _1{}^2\tilde{\theta}^* \times \rfloor) _1{}^2\hat{C}$$

$$^1\hat{x}_i' = {}^1\hat{x}_i + {}^1\hat{x}_i^*.$$

In some embodiments, iterations of a two-view bundle adjustment optimization technique may be repeated until one or more stop criteria are met (e.g., a reduction of the cost function is sufficiently small). Example embodiments pertaining to stop criteria are also discussed with regard to FIG. 5 herein.

FIGS. 2A-2B illustrate determining points of interest within images captured by respective cameras at asynchronous moments in time, according to some embodiments.

In some embodiments, FIGS. 2A and 2B may represent two moments in time at which points of interest may be determined for use in respective iterations of an optimization problem for a camera calibration process. For example, FIG. 2A may represent a Timestep 1, wherein cameras 200 and 202, connected to element 204, may have respective fields of view 206 and 208. As discussed above, points of interest, such as points of interest 210, may be selected for a given iteration of a process such as a process described via blocks 300, 310, and 320. In a second example, FIG. 2B may represent a Timestep 1+N, wherein cameras 200 and 202 may have respective fields of view 220 and 222. In some embodiments, points of interest 224, which may be selected for another iteration of a process such as a process described via blocks 300, 310, and 320, may be the same or different than points of interest 210 (e.g., a success of given iterations of a two-view bundle adjustment may not depend on tracking one or more of the same points of interest across two or more moments in time).

Furthermore, Timestep 1 and Timestep 1+N may represent sequential moments in time (e.g., N=1) or asynchronous moments in time (e.g., N=2, 3, 4, etc.), according to some embodiments (e.g., an optimization technique such as those discussed herein may not depend on using images captured at periodic moments in time, images captured at sequential moments in time, images captured with a certain frequency/repetition, etc.). For example, Timestep 1 may represent a "reference" moment in time such as a moment in time used to set factory calibration parameters, and Timestep 1+N may represent a moment in time that is "in the field" (e.g., during usage of a device comprising cameras 200 and 202 mounted onto element 204). In a second example, Timestep 1 may represent a moment in time before a misalignment event, and Timestep 1+N may represent a moment in time after a misalignment event, and Timesteps 1 and 1+N may be used to determine an amount of misalignment of one or both cameras following said misalignment event and/or to estimate relative rotational parameters of cameras 200 and 202, according to some embodiments. In a third example, Timestep 1 and Timestep 1+N may represent two different moments in time following a misalignment event, and respective iterations of estimating relative rotational parameters corresponding to said respective timesteps may be used to converge to updated output relative rotational parameters, according to some embodiments (see discussion with regard to block 400 herein).

As shown in FIGS. 2A and 2B, fields of view 220 and 222 (at Timestep 1+N) have shifted with respect to positions of fields of view 206 and 208 (at Timestep 1). In some embodiments, shifted fields of view 220 and 222 may be due, at least in part, to movement of a given device (e.g., device 600, 700, 800, etc.) to which element 204 and therefore cameras 200 and 202 are mounted (e.g., a user with the device attached to their head turning their head, stepping forward/backward, etc.).

FIG. 3A is a flow diagram illustrating a process of estimating relative rotational parameters of the cameras via an optimization technique as part of a camera calibration process, according to some embodiments.

In some embodiments, iterations of estimating relative rotational parameters of cameras with overlapping fields of view may resemble a process such as that which is shown in FIG. 3A. In block 300, points of interest from within images captured by cameras with overlapping fields of view at a given moment in time are determined. As described herein, chosen points of interest may be "common" points of interest that may be viewed from the overlapping parts of the overlapping fields of view of the cameras (e.g., points of interest 110, which may be respectively viewed from both field of view 106 and field of view 108). In block 310, pixel coordinate positions of the determined points of interest of block 300 are identified within respective images of the cameras. In block 320, relative rotational parameters of the cameras with respect to one another are estimated via an optimization technique, such as a two-view bundle adjustment optimization process, such as that which is described herein.

As indicated by the arrow in FIG. 3A between block 320 and block 300, a process described by blocks 300, 310, and 320 may be repeated for multiple moments in time. As described herein, such moments in time may be sequential or asynchronous, and a frequency of repetitions of a process described by blocks 300, 310, and 320 may also be further decided based, at least in part, on a current a level of current power consumption of a device comprising the cameras, and/or a level of current processing power of the device, according to some embodiments. In some embodiments, blocks 300, 310, and 320 may represent a first part of a camera calibration process, wherein blocks 300, 310, and 320 may be repeated a given number of times before proceeding to block 400 (as discussed herein with regard to FIG. 4A). The number of repetitions of blocks 300, 310, and 320 may be determined, based, at least in part, on one or more stop criteria that may be used to determine when to stop repeating blocks 300, 310, and 320, according to some embodiments (see also description pertaining to FIG. 5 herein).

FIG. 3B is a flow diagram illustrating a process of performing outlier rejection during a calibration process such as illustrated in FIG. 3A, according to some embodiments.

In some embodiments, the process of determining points of interest within a set of images, as described herein with regard to block 300, may comprise a preselection or prefiltering phase of the points of interest, such as in embodiments described via blocks 302 and 304. Blocks 302 and 304 may be referred to as a process of outlier rejection, according to some embodiments.

In block 302, a subset of potential points of interest may be identified as having high error values (e.g., Sampson error values). In some embodiments, stereo geometry (e.g., for cameras in a stereoscopic configuration such as cameras 100 and 102, or cameras 200 and 202, etc.) may be defined as x'Ex=0, wherein the matrix E is the "essential" or "fundamental" matrix that may be constructed via the translation and rotation of one camera in a stereo pair with respect to the other camera in the stereo pair (e.g., the translation and rotation of camera 100 with respect to camera 102), and x' and x may represent the positions of a given point (e.g., a point of interest) in images captured by cameras 100 and 102 (or vice versa). Sampson error may therefore be defined as a first order approximation of geometric distance. In some embodiments, Sampson error may be determined via a RANdom SAmple Consensus (RANSAC) algorithm, or another algorithm which may remove, reject, identify, or disregard outlier points of interest, or is otherwise robust against said outliers. In block 304, the subset of potential points of interest that have been identified as outliers (e.g., points of interest with high Sampson error values) are removed, and the remaining selected points of interest may be used to estimate relative rotational parameters via an optimization technique, as discussed with regard to blocks 310 and 320.

Figures 4A, 4B:
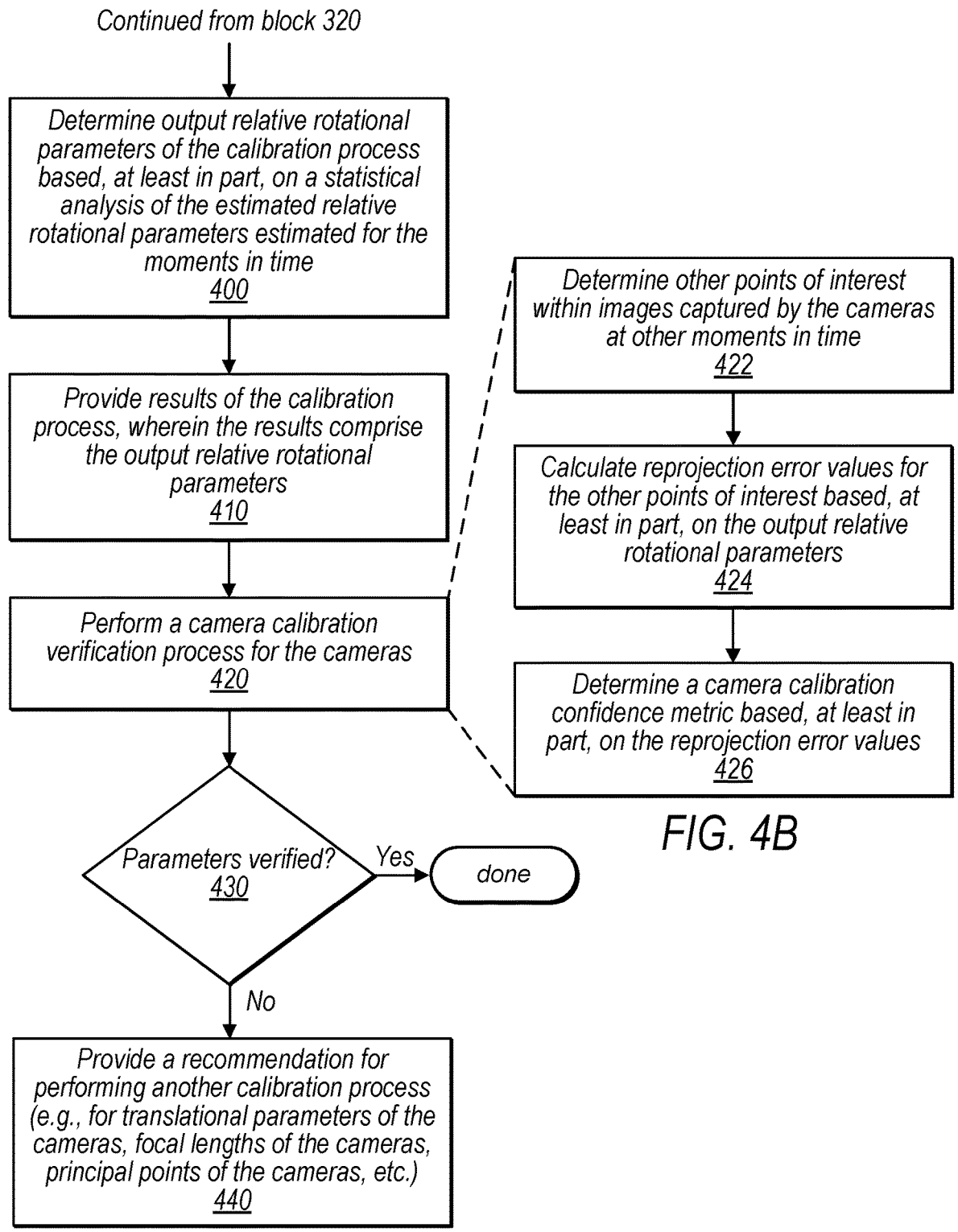
FIG. 4A is a flow diagram illustrating a process of determining output relative rotational parameters (e.g., using estimated relative rotational parameters via a process such as illustrated in FIG. 3A) of the cameras and performing a camera calibration verification process to verify the determined output relative rotational parameters, according to some embodiments.
FIG. 4B is a flow diagram illustrating a process of performing a camera calibration verification process, according to some embodiments.

FIG. 4A is a flow diagram illustrating a process of determining output relative rotational parameters (e.g., using estimated relative rotational parameters via a process such as illustrated in FIG. 3A) of the cameras and performing a camera calibration verification process to verify the determined output relative rotational parameters, according to some embodiments.

In some embodiments, after relative rotational parameters of the cameras have been estimated using images captured for a plurality of moments in time, a statistical analysis may be performed for the estimated relative rotational parameters in order to determine output relative rotational parameters of the calibration process. In some embodiments, a statistical analysis may include calculation of a moving average of the respective estimated relative rotational parameters. In block 410, results (e.g., output relative rotational parameters) of the calibration process (e.g., at least blocks 300, 310, 320, and 400) may be provided. In some embodiments, results of the calibration process may be communicated (e.g., "broadcasted") to additional applications executing on a given device comprising the cameras that may rely on calibration parameters of the cameras. Furthermore, such results may not be communicated if processors (e.g., processors 910) of the device determine that there is not a significant change in the output relative rotational parameters in comparison to previously stored (e.g., via memory 920) output relative rotational parameter values, according to some embodiments. Determining whether or not there has been a significant change in the output relative rotational parameters in comparison to previously stored values may comprise determining whether or not updated values and previously stored values fall within a given threshold of one another, according to some embodiments.

In some embodiments, following the results of the camera calibration process being provided, a camera calibration verification process (e.g., block 420) may be performed for the cameras pertaining to the camera calibration process. For example, following a misalignment-inducing event in which one or both of the cameras are misaligned, a lightweight camera calibration process, such as those described herein for rotational parameters of the cameras, may first be used to attempt to recalibrate the cameras. However, in some embodiments in which the unknown amount of misalignment pertains to one or more relative rotational parameters in addition to one or more other calibration parameters of the cameras (e.g., relative translational parameters, focal lengths, principal points, etc.), it may be advantageous to perform a camera calibration verification process following the camera calibration process (e.g., in which one or more of the rotational parameters were recalibrated in an attempt to correct for a misalignment that also pertains to one or more other calibration parameters) in order to validate the output relative rotational parameters.

In block 430, processors of the device may confirm whether or not the relative rotational parameters represent a valid recalibration of the cameras. Embodiments of block 430 may resemble a threshold limit for the camera calibration confidence metric of block 426, according to some embodiments. For example, if a camera calibration confidence metric is above a certain threshold value, it may be determined that the output relative rotational parameters constitute a valid recalibration of the cameras, and if the camera calibration confidence metric is below the certain threshold value, it may be determined that the output relative rotational parameters do not constitute a valid recalibration of the cameras. Continuing with said example, if it is determined that the output relative rotational parameters do not constitute a valid recalibration of the cameras, a recommendation (e.g., block 440) for the use of one or more other calibration processes may be provided.

FIG. 4B is a flow diagram illustrating a process of performing a camera calibration verification process, according to some embodiments.

In some embodiments, a camera calibration verification process, such as that which is described in block 420, may resemble a process such as that which is described via blocks 422, 424, and 426. In block 422, points of interest within images captured by at least the same cameras as the cameras pertaining to the camera calibration process of blocks 300, 310, 320, 400, and 410 may be determined for moments in time that occur at least after the step described in block 410. In some embodiments of block 422, points of interest may be chosen that occur within the overlapping parts of the fields of view of the cameras. In block 424, reprojection error values for the points of interest of block 422 may be calculated for each set of images captured at the respective moments in time. In some embodiments, the reprojection error values are calculated using the output relative rotational parameters of the camera calibration process such that validity of the output relative rotational parameters may be confirmed (or not) using new input data (e.g., the additional points of interest captured at later moments in time as described with regard to block 422).

In block 426, a camera calibration confidence metric may be calculated, based, at least in part, on the reprojection error values. In some embodiments, a camera calibration confidence metric may represent a value pertaining to the amount of confidence that may be associated to the previously completed camera calibration process. For example, if the camera calibration confidence metric is high, this may verify that the output relative rotational parameters represent an accurate recalibration of the relative rotational parameters of the cameras. In a second example, if the camera calibration confidence metric is low, this may indicate that the output relative rotational parameters may not represent an accurate recalibration of the relative rotational parameters of the cameras (e.g., in the event that a misalignment-inducing event occurs which pertains to the relative rotational parameters of the cameras in addition to one or more other calibration parameters of the cameras). In some embodiments, the calibration conditions quality metric may be a value between zero and one, any analog value with an upper and lower limit, or any other scoring scale, etc. Furthermore, additional factors may contribute to the calculation of a camera calibration confidence metric. For example, if a user of the device were to accidentally cover or obstruct the field of view of one or both cameras during the moments in time in which images were captured in block 422, the camera calibration confidence metric may be set to a low value, such as zero, and the camera calibration verification process execution may proceed at a point in time after which this particular event has ended.

Figure 5:
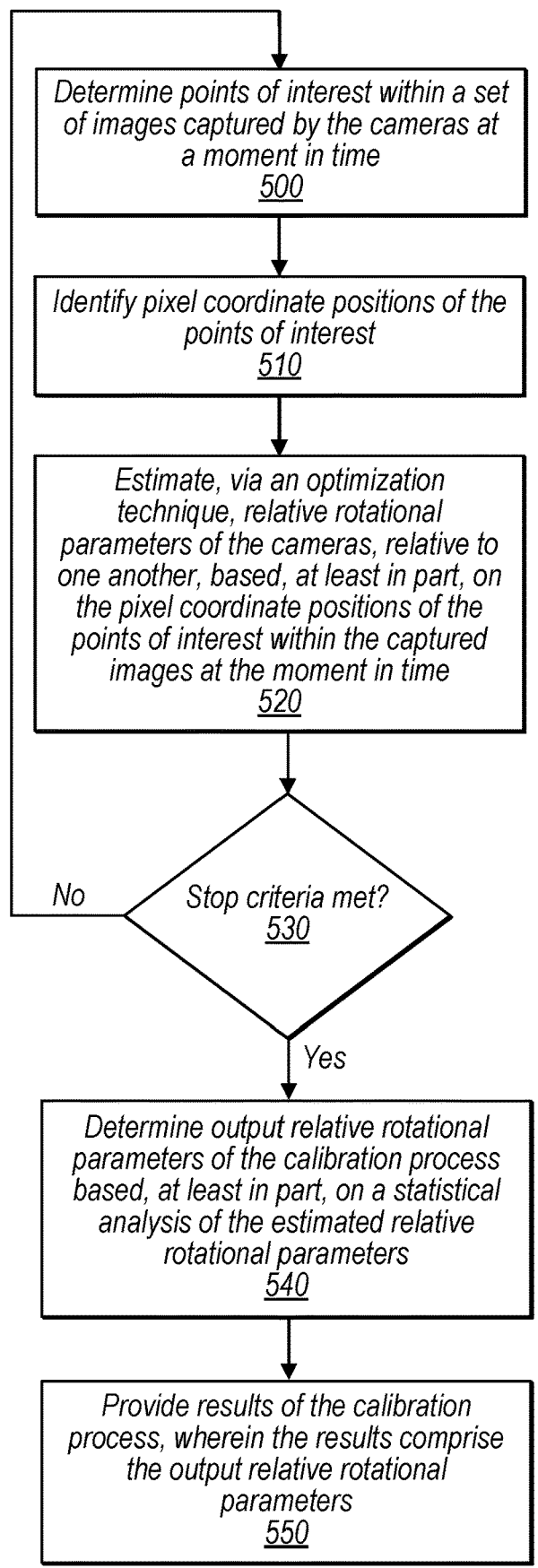
FIG. 5 is a flow diagram illustrating a process of repeating a camera calibration process until stop criteria are met, according to some embodiments.

FIG. 5 is a flow diagram illustrating a process of repeating a camera calibration process until stop criteria are met, according to some embodiments.

In some embodiments, blocks 500, 510, and 520 may resemble blocks 300, 310, and 320 and functionalities used to describe said embodiments herein. Similarly to blocks 300, 310, 320, blocks 500, 510, and 520 may be repeated for a plurality of moments in time, and, after each iteration, block 530 may be used to check whether or not stop criteria have been met. Stop criteria may pertain to a number of times that blocks 500, 510, and 520 may be repeated before determining the output relative rotational parameters (e.g., block 540), according to some embodiments. Stop criteria may also pertain to one or more indications of convergence of estimated relative rotational parameters following a given number of repetitions of the process described by blocks 500, 510, and 520, according to some embodiments. A person having ordinary skill in the art should understand that stop criteria may be a combination of one or more of the examples given above, and/or may contain additional and/or different criteria that may be used to determine if/when to stop the process described by blocks 500, 510, and 520. After the one or more stop criteria are met, output relative rotational parameters are determined via a statistical analysis in block 540, followed by results of the camera calibration process being provided in block 550 (see also description pertaining to blocks 400 and 410 herein). Various combinations of processes described in FIGS. 3A-5 may also be used to perform camera calibration processes that are included in the discussion herein.

Figure 6:
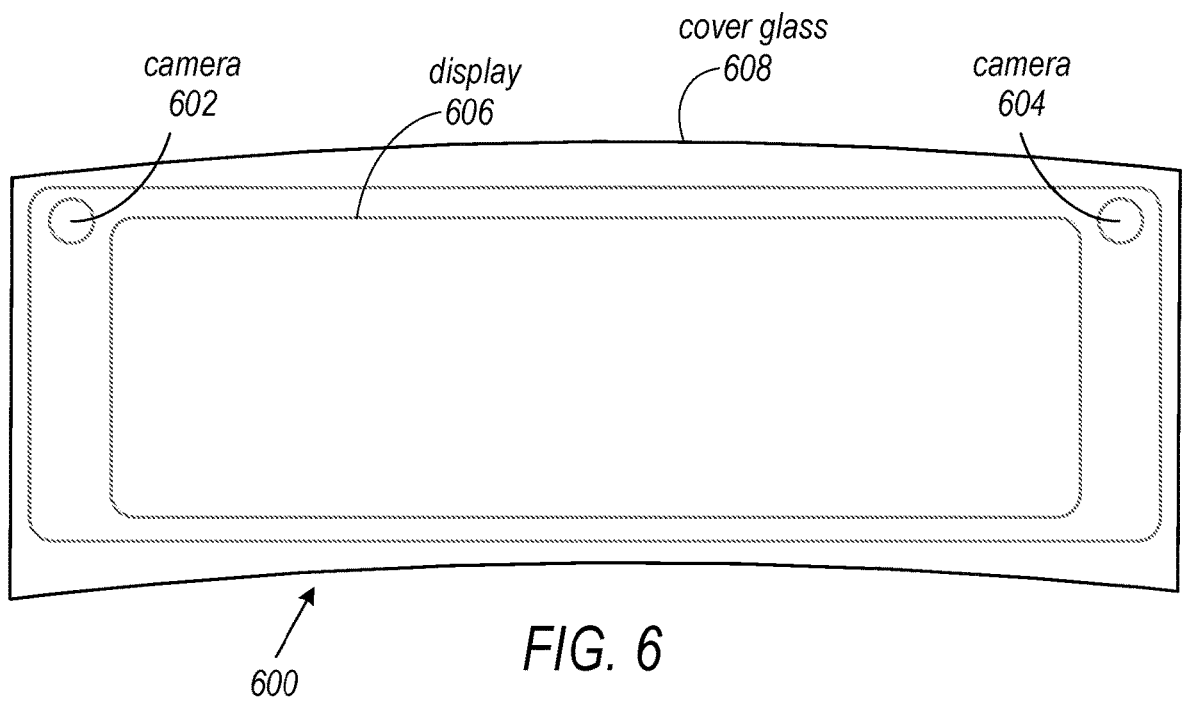
FIG. 6 illustrates an example head-mounted display (HMD) device comprising a frame onto which cameras, a cover glass, and an inertial measurement unit may be mounted, according to some embodiments.
Figure 7:
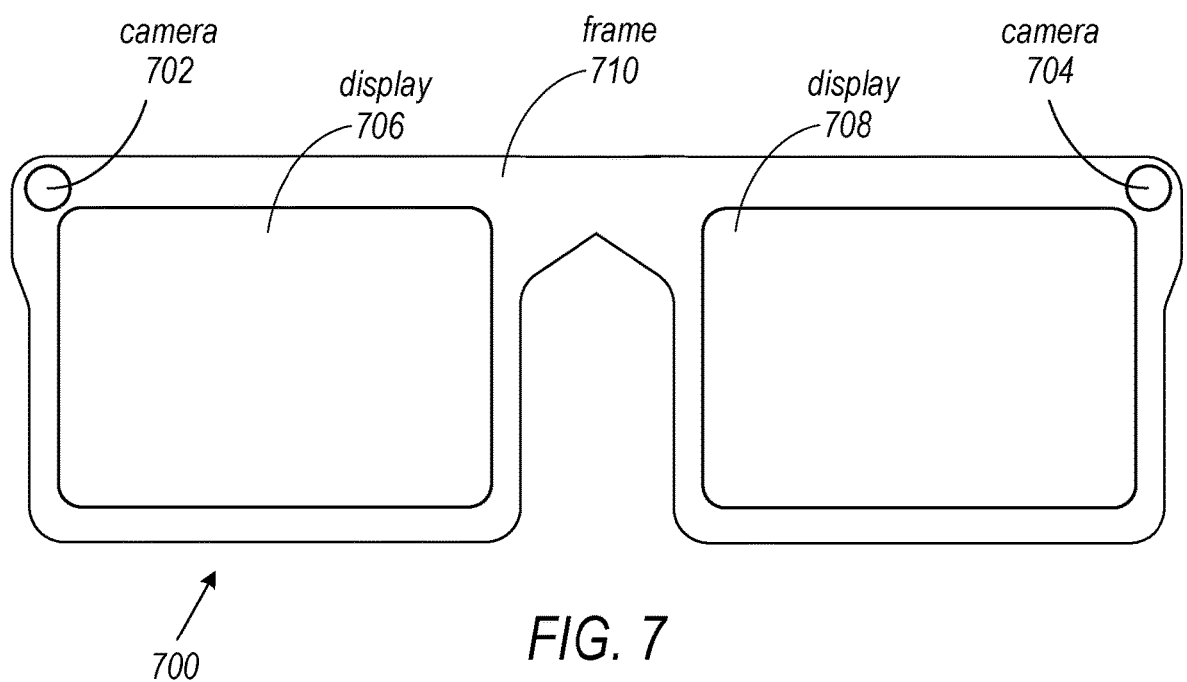
FIG. 7 illustrates another example of a head-mounted display (HMD) device comprising a frame onto which cameras, a cover glass, and an inertial measurement unit may be mounted, according to some embodiments.

FIG. 6 illustrates an example head-mounted display (HMD) device comprising a frame onto which cameras, a cover glass, and an inertial measurement unit may be mounted, according to some embodiments, and FIG. 7 illustrates another example of a head-mounted display (HMD) device comprising a frame onto which cameras and an inertial measurement unit may be mounted, according to some embodiments.

In some embodiments, methods and techniques for executing a camera calibration process may be implemented for cameras of devices 600 and 700, which may resemble extended reality (XR) glasses, goggles, and/or other head-mounted display device designs. Device 600 may have a display for displaying in front of both eyes of the user, such as display 606, in embodiments in which device 600 has a goggles-like device frame. Alternatively, device 700 may have respective displays 706 and 708 for each eye in embodiments in which device 700 has a glasses-like device frame 710. Devices 600 and 700 may be worn on a user's head such that the display(s) are placed in front of the user's eyes and may implement any of various types of display technologies or display systems in order to display images, video, or other content to the user of the device using said displays and/or lenses. In addition, device 600 may have a cover glass, such as cover glass 608, that may be placed in front of at least cameras 602 and 604 and provide protection for the cameras against the outside environment.

As discussed above with regard to elements 104 and 204, cameras 702 and 704 may be mounted onto locally rigid components of frame 710, and there may be other non-rigid components of frame 710 that may deform, such as a flexible nose-piece of frame 710. Similarly, device 600 may be attached to a user's head using an elastic band, while cameras 602 and 604 may be assumed to be mounted to locally rigid components of the goggles-like device frame of device 600.

Figure 8B:
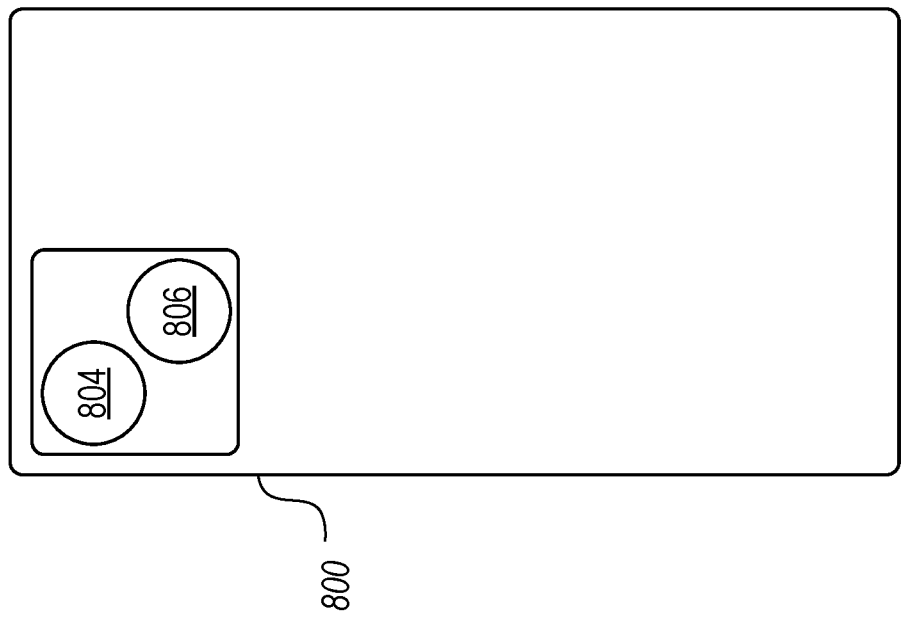
FIGS. 8A and 8B illustrate a front and rear view, respectively, of an example device onto which multiple cameras and an inertial measurement unit may be incorporated, according to some embodiments.
Figure 8A:
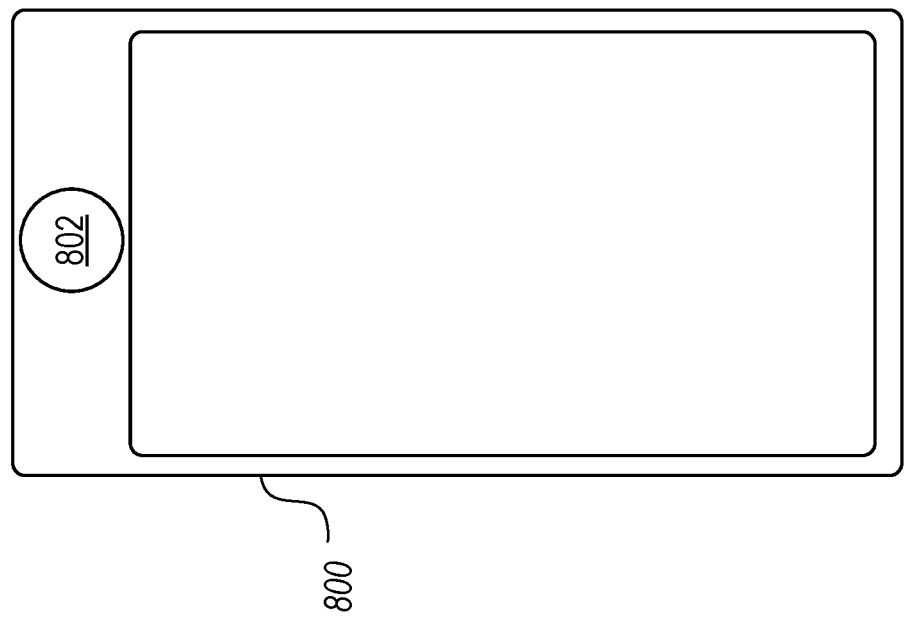

Devices 600 and 700 may have one or more cameras mounted to the respective frames, such as cameras 602 and 604 on device 600 and cameras 702 and 704 on device 700, which respectively have partially overlapping fields of view (e.g., "stereo" cameras). Methods for calibrating relative rotational parameters of cameras (e.g., cameras 602 and 604, 702 and 704, and cameras 802, 804, and 806 in the following FIGS. 8A and 8B) may resemble embodiments discussed with regard to at least FIGS. 1A-5 herein. Note that devices 600 and 700, and device 800 in the following FIGS. 8A and 8B, are given by way of example, and are not intended to be limiting. In various embodiments, the shape, size, and other features of devices 600 and 700 may differ, as well as the locations, numbers, types, and other features of the components of said devices. For example, devices 600 and 700 may have respective inertial measurement units that are integrated into the devices (such as inertial measurement unit(s) 960). Devices 600 and 700 may include additional sensors that may collect information about the user's environment (additional depth information, etc.) and/or about the user themselves (e.g., eye or gaze tracking) as well. In some embodiments, video streams of a real environment captured by cameras 602, 604, 702, and 704 may be processed by one or more processors located on devices 600 or 700, respectively, in order to render augmented or mixed reality frames that include virtual content overlaid on the view of the real environment, and rendered frames may then be provided to display system(s) (e.g., displays 606, or 706 and 708, respectively).

Devices 600 and 700 may also be configured to receive input and/or other information via a wireless interface (e.g., network interface 740). One or more processors implemented locally on devices 600 and 700 may resemble various types of processors, image signal processors (ISPs), graphics processing units (GPUs), coder/decoders (codecs), system on a chip (SOC), CPUs, and/or other components for processing and rendering video and/or images, according to some embodiments. Processors of devices 600 and 700 may render frames that include virtual content based at least in part on inputs obtained from the sensors and/or cameras of devices 600 and 700, and may then provide the frames to the respective display systems.

Devices 600 and 700 may also include memory and/or local storage (e.g., memory 720) that may be used to record video and/or images captured by cameras 602 and 604, or 706 and 708, respectively. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration. In some embodiments, DRAM may be used as temporary storage of images or video for processing, but other storage options may be used in an HMD to store processed data, such as Flash or other "hard drive" technologies.

FIGS. 8A and 8B illustrate a front and rear view, respectively, of an example device onto which multiple cameras and an inertial measurement unit may be incorporated, according to some embodiments.

In some embodiments, the methods and techniques for executing a camera calibration process may also be implemented for cameras of device 800. Device 800 may have similar display and image processing functionalities such as those described above with regard to devices 600 and 700, however device 800 may resemble a tablet or smartphone rather than a head-mounted display. In particular, device 800 may have multiple outward facing cameras, such as camera 802 on the front of device 800 and cameras 804 and 806 on the back of device 800. Device 800 may also have an inertial measurement unit that may be used as input to a camera calibration process for cameras 802, 804, and 806 that may be located inside of the device frame (not depicted in the views shown in FIG. 8A or 8B). In some embodiments, distinct camera calibration processes may exist for device 800: a first calibration process for front-facing camera 802 (e.g., a calibration process such as the calibration processes described with regard to FIGS. 1A-5 herein), and a second calibration process for one or more of the rear-facing cameras 804 and 806. For the rear-facing cameras 804 and 806, each camera may be calibrated separately or concurrently (e.g., using a calibration process such as the calibration process described with regard to FIGS. 1A-5 herein). As camera 802 does not have an overlapping field of view with cameras 804 or 806 by nature of camera 802 facing 180° away from cameras 804 and 806, the calibration processes may occur separately, even if they both make use of the same inertial measurement unit (e.g., inertial measurement unit(s) 960) of device 800.

Figure 9:
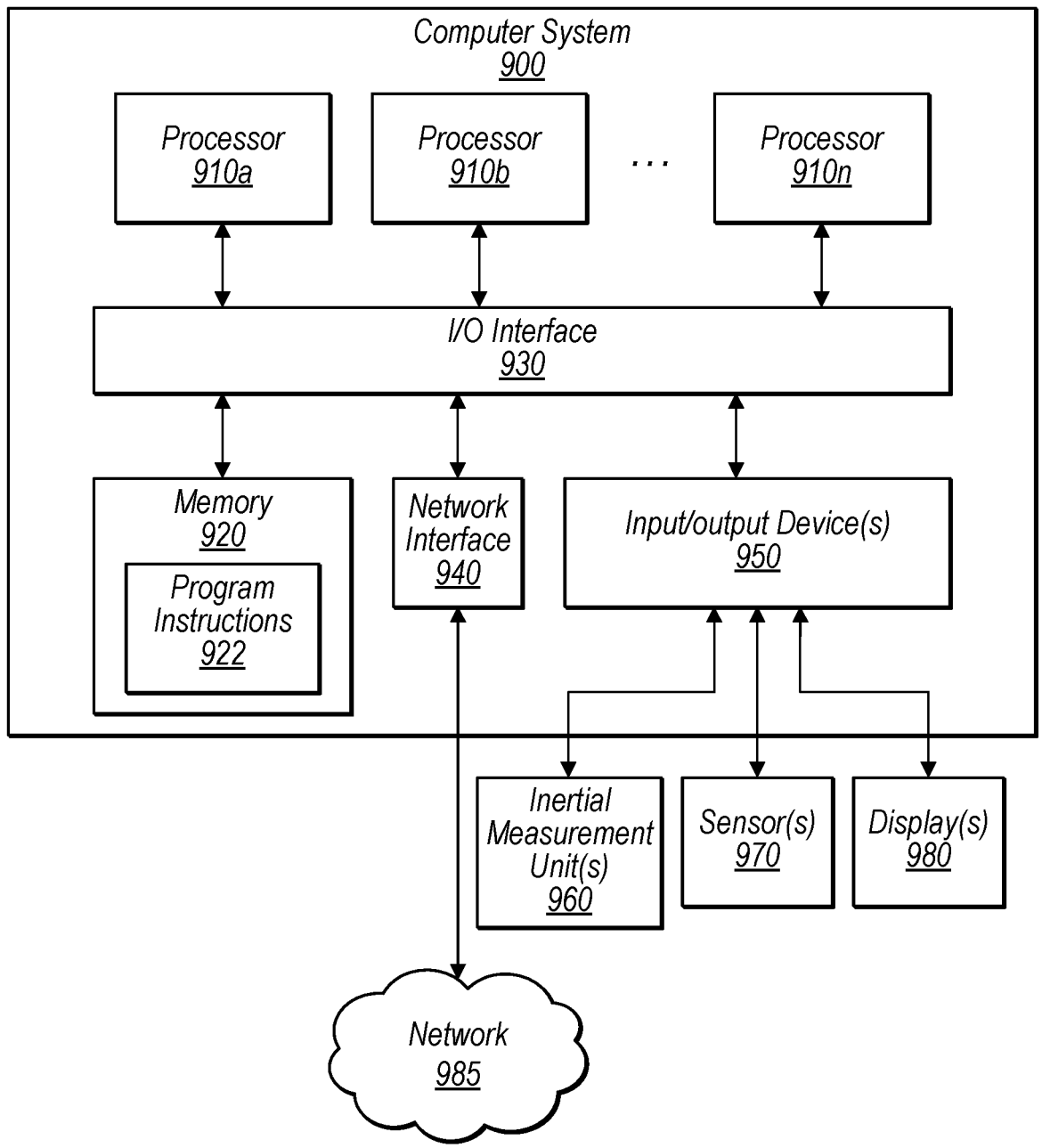
FIG. 9 is a block diagram illustrating an example computing device that may be used in at least some embodiments.

FIG. 9 is a block diagram illustrating an example computing device that may be used in at least some embodiments.

FIG. 9 illustrates exemplary computer system 900 that may be used to perform camera calibration processes such as those described above with regard to FIGS. 1A-8. In different embodiments, computer system 900 may be any of various types of devices, including, but not limited to, a personal computer system, desktop computer, laptop, notebook, tablet, slate, pad, or netbook computer, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of program instructions for performing calibration processes, tracking points of interest, and providing/broadcasting results, as described herein, may be executed in one or more computer systems 900, which may interact with various other devices, such as a LiDAR. Note that any component, action, or functionality described above with respect to FIGS. 1A-8 may be implemented on one or more computers configured as computer system 900 of FIG. 9, according to various embodiments. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as sensor(s) 970 (cameras 100, 102, 200, and 202), display(s) 980 (e.g., displays 606, 706, and 708), and inertial measurement unit(s) 960. Inertial measurement unit(s) 960 may comprise three orthogonal gyroscopes that measure rotational velocity of the device and three orthogonal accelerometers that measure the acceleration along corresponding axes of the device that may be used to further calculate position and orientation of the device by integrating these signals of the inertial measurement unit, according to some embodiments. These position and orientation values may then be used to reference cameras (e.g., cameras 100 and 102) respect to inertial measurement unit(s) 960, according to some embodiments.

In some cases, it is contemplated that embodiments may be implemented using a single instance of computer system 900, while in other embodiments multiple such computer systems, or multiple nodes making up computer system 900, may be configured to host different portions or instances program instructions for performing camera calibrations as described above for various embodiments. For example, in some embodiments, some elements of the program instructions may be implemented via one or more nodes of computer system 900 that are distinct from those nodes implementing other elements.

In some embodiments, computer system 900 may be implemented as a system on a chip (SoC). For example, in some embodiments, processors 910, memory 920, I/O interface 930 (e.g., a fabric), etc. may be implemented in a single SoC comprising multiple components integrated into a single chip. For example, an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 920 may be configured to store program instructions 922 for calibration processes and/or sensor data accessible by processor 910. In various embodiments, system memory 920 may be implemented using any suitable memory technology, such as static random-access memory (SRAM), synchronous dynamic RAM (SDRAM), nonvolatile/Flash-type memory, or any other type of memory. In the illustrated embodiment, program instructions 922 may be configured to implement any of the functionality described above. In some embodiments, program instructions and/or data may be received, sent or stored upon different types of computer-accessible media or on similar media separate from system memory 920 or computer system 900.

In some embodiments, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 985 (e.g., carrier or agent devices) or between nodes of computer system 900. Network 985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, inertial measurement unit(s), sensors, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

As shown in FIG. 9, memory 920 may include program instructions 922, which may be processor-executable to implement any element or action described above. In one embodiment, the program instructions may implement the methods described above. In other embodiments, different elements and data may be included.

Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Extended Reality

A real environment refers to an environment that a person can perceive (e.g., see, hear, feel) without use of a device. For example, an office environment may include furniture such as desks, chairs, and filing cabinets; structural items such as doors, windows, and walls; and objects such as electronic devices, books, and writing instruments. A person in a real environment can perceive the various aspects of the environment, and may be able to interact with objects in the environment.

An extended reality (XR) environment, on the other hand, is partially or entirely simulated using an electronic device. In an XR environment, for example, a user may see or hear computer generated content that partially or wholly replaces the user's perception of the real environment. Additionally, a user can interact with an XR environment. For example, the user's movements can be tracked and virtual objects in the XR environment can change in response to the user's movements. As a further example, a device presenting an XR environment to a user may determine that a user is moving their hand toward the virtual position of a virtual object, and may move the virtual object in response. Additionally, a user's head position and/or eye gaze can be tracked and virtual objects can move to stay in the user's line of sight.

Examples of XR include augmented reality (AR), virtual reality (VR) and mixed reality (MR). XR can be considered along a spectrum of realities, where VR, on one end, completely immerses the user, replacing the real environment with virtual content, and on the other end, the user experiences the real environment unaided by a device. In between are AR and MR, which mix virtual content with the real environment.

Virtual Reality

VR generally refers to a type of XR that completely immerses a user and replaces the user's real environment. For example, VR can be presented to a user using a head mounted device (HMD), which can include a near-eye display to present a virtual visual environment to the user and headphones to present a virtual audible environment. In a VR environment, the movement of the user can be tracked and cause the user's view of the environment to change. For example, a user wearing a HMD can walk in the real environment and the user will appear to be walking through the virtual environment they are experiencing. Additionally, the user may be represented by an avatar in the virtual environment, and the user's movements can be tracked by the HMD using various sensors to animate the user's avatar.

Augmented Reality and Mixed Reality

AR and MR refer to a type of XR that includes some mixture of the real environment and virtual content. For example, a user may hold a tablet that includes a camera that captures images of the user's real environment. The tablet may have a display that displays the images of the real environment mixed with images of virtual objects. AR or MR can also be presented to a user through an HMD. An HMD can have an opaque display, or can use a see-through display, which allows the user to see the real environment through the display, while displaying virtual content overlaid on the real environment.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A device, comprising:
   cameras configured to be coupled with a rigid body, wherein at least part of respective fields of view of the cameras overlap with one another;
   one or more processors; and
   a memory, storing program instructions that when executed using the one or more processors, cause the one or more processors to:
      perform a calibration process for the cameras, wherein to perform the camera calibration process the program instructions cause the one or more processors to:
         determine points of interest within a first set of images captured by the cameras at a first moment in time;
         identify pixel coordinate positions of the points of interest of the first set of images;
         estimate, via an optimization technique, relative rotational parameters of the cameras, relative to one another, based, at least in part, on the pixel coordinate positions of the points of interest within the captured images at the first moment in time; and
         repeat, for a plurality of additional sets of images captured by the cameras at a plurality of additional moments in time, the determination of points of interest, the identification of pixel coordinate positions of the points of interest, and the estimation, via the optimization technique, of the relative rotational parameters of the cameras; and
         determine output relative rotational parameters of the calibration process based, at least in part, on a statistical analysis of the estimated relative rotational parameters estimated for the first moment in time and the plurality of additional moments in time; and
      provide results of the calibration process, wherein the results comprise the output relative rotational parameters.

2. The device of claim 1, wherein the optimization technique is a bundle adjustment optimization technique.

3. The device of claim 1, wherein the first moment in time and the plurality of additional moments in time are asynchronous with respect to one another.

4. The device of claim 1, wherein at least one or more of the points of interest within the first set of images and the points of interest within the plurality of additional sets of images are different with respect to one another.

5. The device of claim 1, wherein:
   a duration of the calibration process is determined based, at least in part, on at least one of:
      a level of current power consumption of the device; or
      a level of current processing power of the device; and
   the duration of the calibration process comprises the first moment in time and the plurality of additional moments in time.

6. The device of claim 1, wherein:
   a duration of the calibration process is determined based, at least in part, on one or more stop criteria, wherein the stop criteria comprise a convergence threshold to which the relative rotational parameters of the first moment in time and the plurality of additional moments in time converge within; and
   the duration of the calibration process comprises the first moment in time and the plurality of additional moments in time.

7. The device of claim 1, wherein the estimate, via the optimization technique, the rotational parameters of the cameras is additionally based, at least in part, on one or more of:
   translational parameters of the cameras relative to the rigid body of the device;
   focal lengths of the cameras; or
   principal points of the cameras.

8. The device of claim 1, wherein the device is a head-mounted display (HMD) device.

9. A method, comprising:
   performing a calibration process for cameras configured to be coupled with a rigid body of a device, wherein:
      at least part of respective fields of view of the cameras overlap with one another; and
      the calibration process comprises:
         determining points of interest within a first set of images captured by the cameras at a first moment in time;
         identifying pixel coordinate positions of the points of interest of the first set of images;
         estimating, via an optimization technique, relative rotational parameters of the cameras, relative to one another, based, at least in part, on the pixel coordinate positions of the points of interest within the captured images at the first moment in time; and
         repeating, for a plurality of additional sets of images captured by the cameras at a plurality of additional moments in time, the determining the points of interest, the identifying the pixel coordinate positions of the points of interest, and the estimating, via the optimization technique, the relative rotational parameters of the cameras; and
         determining output relative rotational parameters of the calibration process based, at least in part, on a statistical analysis of the estimated relative rotational parameters estimated for the first moment in time and the plurality of additional moments in time; and
   providing results of the calibration process, wherein the results comprise the output relative rotational parameters.

10. The method of claim 9, wherein:
    the points of interest within the first set of images are determined based, at least in part, on one or more of:
       a quality of lighting in the first set of captured images;
       respective distances between the points of interest within the first set of images in 3D space and the cameras; or
       a spatial distribution within the overlapping fields of view of the cameras of the points of interest within the first set of images; and
    the points of interest within the additional sets of images are determined based, at least in part, on one or more of:
       a quality of lighting in the additional sets of captured images;
       respective distances between the points of interest within the additional sets of images in 3D space and the cameras; or
       a spatial distribution within the overlapping fields of view of the cameras of the points of interest within the additional sets of images.

11. The method of claim 9, wherein:
    said determining the points of interest comprises:
       identifying respective ones of the points of interest within the first set of images that have high error values; and
       removing the respective ones of the points of interest within the first set of images that have the high error values; and
    said repeating, for the plurality of additional sets of images, the determining the points of interest comprises:
       identifying respective ones of the points of interest within the additional sets of images that have high error values; and
       removing the respective ones of the points of interest within the additional sets of images that have the high error values.

12. The method of claim 9, further comprising:
    performing, responsive to said providing the results of the calibration process, a camera calibration verification process for the cameras, wherein the camera calibration verification process comprises:
       determining other points of interest within images captured by the cameras at other moments in time;
       calculating reprojection error values for the other points of interest based, at least in part, on the output relative rotational parameters; and
       determining a camera calibration confidence metric based, at least in part, on the reprojection error values; and
    verifying the results of the calibration process based, at least in part, on the camera calibration confidence metric.

13. The method of claim 9, further comprising:
    performing, responsive to said providing the results of the calibration process, a camera calibration verification process for the cameras, wherein the camera calibration verification process comprises:
       determining other points of interest within images captured by the cameras at other moments in time;
       calculating reprojection error values for the other points of interest based, at least in part, on the output relative rotational parameters; and
       determining a camera calibration confidence metric based, at least in part, on the reprojection error values; and
    providing a recommendation to perform at least one other calibration process based, at least in part, on the camera calibration confidence metric.

14. The method of claim 13, wherein the at least one other calibration process pertains to calibration of one or more of:
- translational parameters of the cameras relative to one another;
- focal lengths of the cameras; or
- principal points of the cameras.

15. The method of claim 9, further comprising:
- determining that one or more of the output relative rotational parameters has changed more than a threshold amount with respect to stored relative rotational parameters of the cameras; and
- sending the one or more of the output relative rotational parameters to one or more systems of the device that use the cameras.

16. A non-transitory computer-readable medium storing program instructions that, when executed using one or more processors, cause the one or more processors to:
- perform a calibration process for cameras, wherein:
  - at least part of respective fields of view of the cameras overlap with one another; and
  - the calibration process comprises:
    - determine points of interest within a first set of images captured by the cameras at a first moment in time;
    - identify pixel coordinate positions of the points of interest of the first set of images;
    - estimate, via an optimization technique, relative rotational parameters of the cameras, relative to one another, based, at least in part, on the pixel coordinate positions of the points of interest within the captured images at the first moment in time; and
    - repeat, for a plurality of additional sets of images captured by the cameras at a plurality of additional moments in time, the determine the points of interest, the identify the pixel coordinate positions of the points of interest, and the estimate, via the optimization technique, the relative rotational parameters of the cameras; and
    - determine output relative rotational parameters of the calibration process based, at least in part, on a statistical analysis of the estimated rotational parameters estimated for the first moment in time and the plurality of additional moments in time; and
- provide results of the calibration process, wherein the results comprise the output relative rotational parameters.

17. The non-transitory computer-readable medium of claim 16, wherein the program instructions, when executed using the one or more processors, further cause the one or more processors to:
- determine that one or more of the output relative rotational parameters have changed more than a threshold amount with respect to stored relative rotational parameters of the cameras; and
- send the one or more of the output relative rotational parameters to applications that use the cameras.

18. The non-transitory computer-readable medium of claim 17, wherein to determine that the one or more of the output relative rotational parameters have changed more than the threshold amount, the program instructions cause the one or more processors to:
- perform a camera calibration verification process for the cameras, wherein the camera calibration verification process comprises:
  - determine other points of interest within images captured by the cameras at other moments in time;
  - calculate reprojection error values for the other points of interest based, at least in part, on the output relative rotational parameters; and
  - determine a camera calibration confidence metric based, at least in part, on the reprojection error values; and
- verify the results of the calibration process based, at least in part, on the camera calibration confidence metric.

19. The non-transitory computer-readable medium of claim 16, wherein:
- a duration of the calibration process is determined based, at least in part, on one or more stop criteria, wherein the stop criteria comprise a convergence threshold to which the relative rotational parameters pertaining to the first moment in time and the plurality of additional moments in time converge within; and
- the duration of the calibration process comprises the first moment in time and the plurality of additional moments in time.

20. The non-transitory computer-readable medium of claim 16, wherein at least one or more of the points of interest within the first set of images and the points of interest within the plurality of additional sets of images are different with respect to one another.

* * * * *